United States Patent
Higuchi et al.

(10) Patent No.: US 10,067,804 B2
(45) Date of Patent: Sep. 4, 2018

(54) APPARATUS, METHOD, AND NON-TRANSITORY COMPUTER-READABLE STORAGE MEDIUM FOR STORING PROGRAM FOR PERFORMANCE REQUIREMENT ESTIMATION

(71) Applicant: FUJITSU LIMITED, Kawasaki-shi, Kanagawa (JP)

(72) Inventors: Junichi Higuchi, Kawasaki (JP); Masazumi Matsubara, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/881,828

(22) Filed: Jan. 29, 2018

(65) Prior Publication Data
US 2018/0217876 A1  Aug. 2, 2018

(30) Foreign Application Priority Data
Feb. 2, 2017  (JP) .................................. 2017-017798

(51) Int. Cl.
*G06F 9/455* (2018.01)
*G06F 9/50* (2006.01)

(52) U.S. Cl.
CPC ........ *G06F 9/5088* (2013.01); *G06F 9/45558* (2013.01); *G06F 9/5016* (2013.01);
(Continued)

(58) Field of Classification Search
CPC .................................................. G06F 9/5088
See application file for complete search history.

(56) References Cited

U.S. PATENT DOCUMENTS

2006/0175393 A1* 8/2006 Hayamatsu ......... G06F 11/3409
  235/379
2015/0052526 A1* 2/2015 Fujiwaka ............ G06F 11/3433
  718/1
(Continued)

FOREIGN PATENT DOCUMENTS

JP   2006-155137   6/2006
JP   2014-085809   5/2014
(Continued)

*Primary Examiner* — Sisley Kim
(74) *Attorney, Agent, or Firm* — Fujitsu Patent Center

(57) ABSTRACT

A method for performance requirement estimation includes: acquiring system performance requirement information indicating requirements of a performance value with respect to processes pertaining to each of processing classifications; acquiring resource information indicating the amount of resources with respect to a plurality of second machines included in a new system to be configured to perform the processes pertaining to each of the processing classifications; determining whether or not the new system satisfies requirements of a performance value with respect to a processes pertaining to each of the processing classifications in accordance with the system performance requirement information, the resource information, and a model configured to output a performance value with respect to the processes pertaining to each of the processing classifications in accordance with an input indicating the amount of resources to be distributed for performing the processes; and outputting a determination result obtained by the determining.

6 Claims, 22 Drawing Sheets

(52) U.S. Cl.
CPC ........ *G06F 2009/4557* (2013.01); *G06F 2009/45583* (2013.01)

(56) References Cited

U.S. PATENT DOCUMENTS

2015/0269053 A1\* 9/2015 Kato ............ G06F 11/3428
718/105
2016/0112289 A1 4/2016 Kubota

FOREIGN PATENT DOCUMENTS

JP 2016-082497 5/2016
WO 2013/132735 9/2013

\* cited by examiner

| WORK CLASSIFICATION NUMBER i | WORK CLASSIFICATION | SYSTEM PERFORMANCE MODEL | |
|---|---|---|---|
| 1 | ORDERING | $y_1 = 25000x_1^{-1} + 75000x_2^{-1} + 200$ | 1101-1 |
| 2 | ESTIMATE REQUEST | $y_2 = 15000x_1^{-1} + 200$ | 1101-2 |
| 3 | INSPECTION | $y_3 = 50000x_1^{-1} + 125000x_2^{-1} + 300$ | 1101-3 |

SYSTEM PERFORMANCE MODEL INFORMATION ~150

FIG. 13

INFRA PERFORMANCE REQUIREMENT INFORMATION ~413

| WORK CLASSIFICATION NUMBER i | WORK CLASSIFICATION | SYSTEM PERFORMANCE REQUIREMENT | |
|---|---|---|---|
| 1 | ORDERING | $25000x_1^{-1} + 75000x_2^{-1} + 200 \leq 3000$ | 1301-1 |
| 2 | ESTIMATE REQUEST | $15000x_1^{-1} + 200 \leq 1000$ | 1301-2 |
| 3 | INSPECTION | $50000x_1^{-1} + 125000x_2^{-1} + 300 \leq 5000$ | 1301-3 |

FIG. 14

POST-RENEWAL INFRA INFORMATION ~170

| SERVER TYPE | MEMORY [GB] | CPU PERFORMANCE VALUE (COMMON INDEX) | PRICE [YEN/TIME] |
|---|---|---|---|
| small | 4 | 25 | 10 |
| medium | 8 | 50 | 19 |
| large | 16 | 100 | 36 |

| WORK CLASSIFICATION | AVERAGE PROCESSING TIME OF Web/AP SERVER [MSEC] | AVERAGE PROCESSING TIME OF DB SERVER [MSEC] | |
|---|---|---|---|
| ORDERING | 30 | 8 | ~1801-1 |
| ESTIMATE REQUEST | 20 | - | ~1801-2 |
| INSPECTION | 50 | 10 | ~1801-3 |

APPARATUS, METHOD, AND NON-TRANSITORY COMPUTER-READABLE STORAGE MEDIUM FOR STORING PROGRAM FOR PERFORMANCE REQUIREMENT ESTIMATION

CROSS-REFERENCE TO RELATED APPLICATION

This application is based upon and claims the benefit of priority of the prior Japanese Patent Application No. 2017-017798, filed on Feb. 2, 2017, the entire contents of which are incorporated herein by reference.

FIELD

The embodiment discussed herein is related to an apparatus, a method, and a non-transitory computer-readable storage medium for storing a program for performance requirement estimation.

BACKGROUND

In the related art, there is a case where renewal is performed in which a system configured of a plurality of servers is reconfigured by using other servers, or is reconfigured on a cloud. For example, the related art discloses that performance information of a migration target virtual machine (VM) is converted into a combination of a workload amount and a workload property value in relation to the migration target VM, and the converted combination is applied to a performance model of a migration destination server apparatus which is a candidate of a migration destination of the VM. In addition, the related art discloses that, in a first processing system and a second processing system, a performance ratio of a metric in the second processing system to a metric in the first processing system is calculated based on a metric value at a time of executing a predetermined benchmark processing.

In addition, there is a technique in which when a first load amount obtained by using work processing amount data estimated to be processed in an analysis target system based on a plurality of work items and a second load amount based on operation status data of the system satisfy a predetermined conditions, data which serves as a basis for calculating the first load amount is determined to be appropriate. Moreover, there is a technique in which, from a delay time due to packet loss based on the number of packet loss between a client at a first point and a server and network quality information at a time when a client at a second point communicates with the server, a response time of the server to an operation performed by the client at the second point is predicted.

Examples of the related art include International Publication Pamphlet No. WO 2013/132735, Japanese Laid-open Patent Publication No. 2014-85809, Japanese Laid-open Patent Publication No. 2006-155137, and Japanese Laid-open Patent Publication No. 2016-82497.

SUMMARY

According to an aspect of the invention, a method for performance requirement estimation, which is performed by a computer, includes: executing, by a processor of the computer, a distribution processing that includes distributing a use amount per unit time with respect to resources in each of a plurality of first machines included in a system to each of processing classifications in accordance with use information and demand information, in which the system is configured to execute processes pertaining to each of the processing classifications, in which the use information indicates the use amount with respect to the resources in each of the plurality of first machines when each of the plurality of first machines is used in executing the processes pertaining to each of the processing classifications, and in which the demand information indicates the number of demands per unit time with respect to the processes pertaining to each of the processing classifications, executing, by the processor of the computer, a creation processing that includes creating a model corresponding to each of the processing classifications in accordance with both of system performance information and the use amount distributed to each of the processing classifications, in which the model is configured to output a performance value with respect to the processes pertaining to each of the processing classifications in accordance with an input indicating the amount of resources to be distributed for performing the processes, and in which the system performance information indicates a performance value per unit time with respect to a processes pertaining to each of the processing classifications in the system, executing, by the processor of the computer, a determination processing that includes acquiring system performance requirement information indicating requirements of a performance value with respect to the processes pertaining to each of the processing classifications, acquiring resource information indicating the amount of resources with respect to a plurality of second machines included in a new system to be configured to perform the processes pertaining to each of the processing classifications, and determining whether or not the new system satisfies the requirements of the performance value with respect to the processes pertaining to each of the processing classifications in accordance with the model, the system performance requirement information, and the resource information, and executing, by the processor of the computer, an output processing that includes outputting a determination result obtained by the determination processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is an explanatory view illustrating an example of the stored content of infra performance requirement information;

FIG. 14 is an explanatory view illustrating an example of the stored content of post-renewal infra information;

FIG. 18 is an explanatory view illustrating an example of another calculation method of a distribution use amount;

DESCRIPTION OF EMBODIMENT

According to the related art, when renewing a system that performs a processing pertaining to each of processing classifications of a plurality of processing classifications, it is difficult to specify whether or not a new system which is a candidate of a renewal destination satisfies performance requirements corresponding to each of the processing classifications. For example, since available information is information as a whole system before renewal, it is not possible to specify the amount of resources used in each of the processing classifications in the system before renewal. Therefore, even if the amount of the resources used in each of the processing classifications in the system before renewal is assumed to be an amount obtained by equally distributing the amount of the resources of the whole system before renewal, it may be not possible to obtain a determination result with favorable accuracy.

In an aspect of the present disclosure, provided are technologies for performance requirement estimation that are capable of obtaining a determination result with favorable accuracy as to whether or not a new system satisfies performance requirements corresponding to each of the processing classifications.

Hereinafter, embodiments of the program for performance requirement estimation, the apparatus for performance requirement estimation, and the method for performance requirement estimation will be described in detail with reference to drawings.

Figure 1:
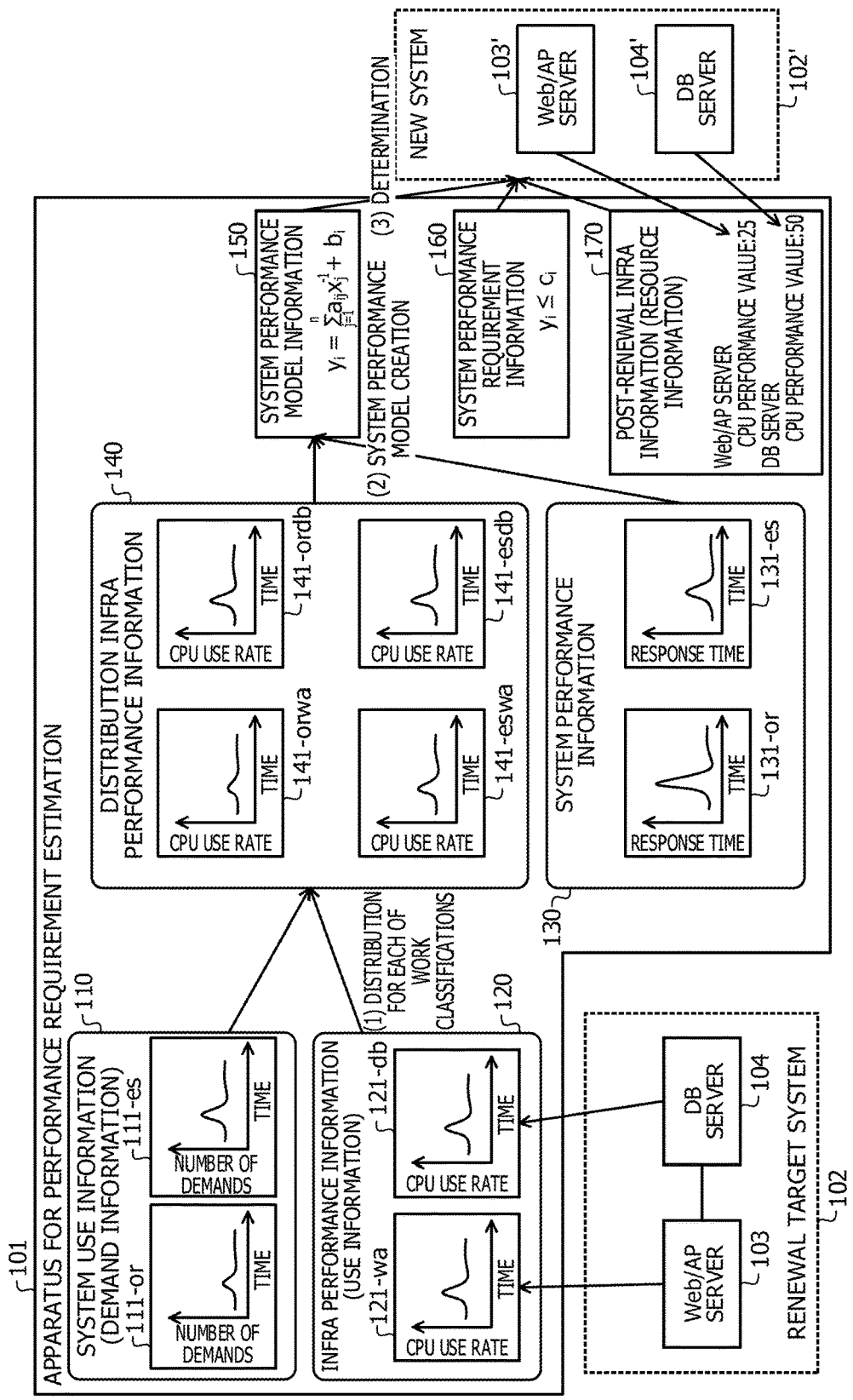
FIG. 1 is an explanatory view illustrating an operation example of an apparatus for performance requirement estimation according to an embodiment.

FIG. 1 is an explanatory view illustrating an operation example of an apparatus for performance requirement estimation 101 according to an embodiment. The apparatus for performance requirement estimation 101 is a computer that estimates performance requirements of a system which is a renewal target. The apparatus for performance requirement estimation 101 is a server, for example.

The renewal target system which is a renewal target includes one or more machines. The machine is, for example, a server or a network machine. For example, the renewal target system is a web three-tier system configured of a plurality of servers. In an embodiment, the machine is set as a server. There is a case where renewal is performed in which a system configured of a plurality of servers is reconfigured by using other servers, or is reconfigured on a cloud. Here, the machine which is hardware serving as a base for configuring a system is called infrastructure. Hereinafter, infrastructure is referred to as "infra". In recent years, transfer of existing systems in a physical environment or a virtual environment to clouds has been proceeded.

Regarding a determination method as to whether or not performance requirements of an entire system are satisfied, it is considered to actually examine the performance on a cloud which is a transfer destination. In addition, there is a case where performance requirements of an entire system are present for each of processing classifications. In the embodiment, a system is a work system which processes a work processing, and performance requirements of the entire system are present for each of the work classifications. The work classification is a classification of work processing that the work system includes as functions. For example, in a case of a purchase system, the work classification refers to an ordering work, an estimate request work, an inspection work, and the like. In addition, as performance requirements of an entire system serving as the work system, for example, online response time, batch processing time, and the like for each of the work classifications are conditions to be satisfied.

However, when actually examining performance on a cloud which is a transfer destination, it is desired to determine whether a lot of systems that a client possesses may be transferred to each cloud of a plurality of clouds which are transfer candidates, and thus it takes a few minutes of man-hour for a cloud.

Here, when infra performance information of a cloud is identified, feasibility of transfer may be determined. Thus, it is desirable to understand infra performance requirements that may satisfy performance requirements of the entire system. Here, the infra performance requirements include a central processing unit (CPU) performance value of a server, a memory amount, a network loss rate, network delay, and a network band. The infra performance requirements are defined at the time of system design, but there is a possibility that there is a work classification for which requirement is not defined, system changes occur, or the requirement is deviated from the requirement at the time of design.

Therefore, when renewing a system that executes a processing pertaining to each of work classifications of a plurality of work classifications, it is difficult to specify whether or not a new system which is a renewal destination satisfies performance requirements corresponding to each of the work classifications. Specifically, since available information is information as a whole system before renewal, it is not possible to specify the amount of the resources used in each of the work classifications in the system before renewal. In addition, in a case where the system before renewal is configured in a multiple-tiered structure constituted of a plurality of servers, not all the multiple-tiered servers are used in all the work classifications. Therefore, even if the amount of the resources used in each of the work classifications in the system before renewal is assumed to be an amount obtained by equally distributing the amount of the resources of the whole system, it is not possible to obtain a determination result with favorable accuracy.

Here, in the embodiment, description will be provided on determining whether or not performance requirements for each of the work classifications is satisfied by substituting a model created from an amount obtained by distributing a use amount of resources of a system before renewal to the number of demands for each of the work classifications and a performance value for each of the work classifications with the amount of resources of a new system.

An operation example of the apparatus for performance requirement estimation 101 is explained with reference to FIG. 1. The apparatus for performance requirement estimation 101 illustrated in FIG. 1 estimates performance requirements of a renewal target system 102, and determines whether or not a new system 102' which is a candidate of a renewal destination of the renewal target system 102 satisfies performance requirements corresponding to each of the work classifications. The renewal target system 102 is a web three-tier system including a Web/Application (AP) server 103 and a data base (DB) server 104. Here, the Web/AP server 103 may be a physical machine, or may be a virtual machine.

The renewal target system 102 illustrated in FIG. 1 executes a processing pertaining to an ordering work and an estimate request work as a plurality of work classifications. In addition, the new system 102' may execute a processing pertaining to the same processing classifications as those of the renewal target system 102. The new system 102' includes a Web/AP server 103' and a DB server 104'. Here, the Web/AP server 103' and the DB server 104' included in the new system 102' may be a physical machine, or may be a virtual machine.

In addition, for simplifying explanation, the Web/AP server 103 and the DB server 104 illustrated in FIG. 1 are used together in the ordering work and the estimate request work. Furthermore, for simplifying explanation, in the explanation of FIG. 1, the resource is confined to a CPU of the Web/AP server 103 and the DB server 104.

As illustrated in (1) of FIG. 1, the apparatus for performance requirement estimation 101 distributes a use amount per unit time of resources of the Web/AP server 103 or the DB server 104 included in the renewal target system 102 to each of the work classifications based on use information and demand information. Here, the use information discloses a use amount per unit time of resources of the Web/AP server 103 or the DB server 104 when a server included in the renewal target system 102 is used for each of the work classifications. In addition, the demand information discloses the number of demands per unit time of a processing pertaining to each of the work classifications with respect to the renewal target system 102 corresponding to each of the work classifications. In addition, the unit time may be any length of time, for example, 1 minute, 5 minutes, 30 minutes, 1 hour, and the like.

Hereinafter, the demand information is set as system use information 110. The use information is set as infra performance information 120. In addition, FIG. 1 illustrates the number of demands per unit time of a processing pertaining to each of the work classifications with respect to the renewal target system 102 corresponding to each of the work classifications, included in the system use information 110, as graphs 111-*or* and 111-*es* in a simulated manner. In the following explanation, there is a case in which, in a case of distinguishing the same classification of elements, reference signs such as "graph 111-*or*" and "graph 111-*es*" are used, and in a case of not distinguishing the same classification of elements, only the common number in the reference signs such as "graph 111" is used. The graph 111-*or* is a graph corresponding to the ordering work. In addition, the graph 111-*es* is a graph corresponding to the estimate request work. The axis of abscissa of the graph 111 represents time, and the axis of ordinates of the graph 111 represents the number of demands.

Similarly, FIG. 1 illustrates a CPU use rate which is a use amount per unit time of resources of the Web/AP server 103 or the DB server 104, included in the infra performance information 120, as a graph 121-*wa* and a graph 121-*db*, in a simulated manner. The graph 121-*wa* is a graph illustrating a CPU use rate per unit time of the Web/AP server 103. In addition, the graph 121-*db* is a graph illustrating a CPU use rate per unit time of the DB server 104.

For example, the apparatus for performance requirement estimation 101 distributes the use amount per unit time of resources of the Web/AP server 103 or the DB server 104 to each of the work classifications, depending on a proportion of the number of demands of each of the work classifications. For example, at a certain time, the number of demands of the ordering work per unit time is 100, the number of demands of the estimate request work is 200, and the CPU use rate of the Web/AP server 103 is 30%. In this case, the apparatus for performance requirement estimation 101 distributes 10% of the CPU use rate of the Web/AP server 103 to the ordering work and 20% of the CPU use rate of the Web/AP server 103 to the estimate request work.

As a result of processing of (1) of FIG. 1, the apparatus for performance requirement estimation 101 creates distribution infra performance information 140 disclosing a use amount per unit time of resources of each server distributed to each of the processing classifications. The distribution infra performance information 140 illustrated in FIG. 1 schematically illustrates a use amount per unit time of resources of each server distributed to each of the processing classifications as graphs 141-*orwa*, 141-*ordb*, 141-*eswa*, and 141-*esdb*. The graph 141-*orwa* is a graph illustrating a CPU use amount per unit time of the Web/AP server 103 distributed to the ordering work. In addition, the graph 141-*ordb* is a graph illustrating a CPU use amount per unit time of the DB server 104 distributed to the ordering work. In addition, the graph 141-*eswa* is a graph illustrating a CPU use amount per unit time of the Web/AP server 103 distributed to the estimate request work. In addition, the graph 141-*esdb* is a graph illustrating a CPU use rate per unit time of the DB server 104 distributed to the estimate request work.

Next, the apparatus for performance requirement estimation 101 creates a system performance model corresponding to each of the work classifications based on the distribution infra performance information 140 and the system performance information 130, as illustrated in (2) of FIG. 1. The system performance information 130 is information disclosing a performance value per unit time in relation to a processing pertaining to each of the work classifications in the renewal target system 102. Here, the performance value relates to a processing pertaining to each of the work classifications, for example, a response time to a demand. In addition, the performance value may be the number of demands that may be processed in a unit time. In the example of FIG. 1, the performance value is set as a response time. The system performance information 130 illustrated in FIG. 1 schematically illustrates a response time per unit time in each of the work classifications as graphs 131-*or* and 131-*es*. The graph 131-*or* is a graph illustrating a response time per unit time in the ordering work. In addition, the graph 131-*es* is a graph illustrating a response time per unit time in the estimate request work.

In addition, the system performance model is a model that outputs a performance value in relation to a processing pertaining to each of the work classifications in accordance with the input amount of resources. Specifically, the apparatus for performance requirement estimation 101 creates the system performance model using a regression analysis in which the amount of resources of each server is set as an explanatory variable and a performance value is set as an objective variable. In addition, when creating the system performance model, the apparatus for performance requirement estimation 101 converts the distributed distribution CPU use rate, included in the distribution infra performance information 140, into a distribution CPU performance value and thereby creates the system performance model. For example, the apparatus for performance requirement estimation 101 may obtain the distribution CPU performance value by multiplying the distribution CPU use rate by the CPU performance value at the time when the CPU use rate in the server is 100%.

In the example of FIG. 1, the apparatus for performance requirement estimation 101 creates the system performance model represented by Expression (1) corresponding to each of the work classifications, based on the distribution infra performance information 140 and the system performance information 130.

$$y_i = \sum_{j=1}^{n} a_{ij} x_j^{-1} + b_i \quad (1)$$

Here, i represents a number that identifies a work classification. j represents a number that identifies a resource of a j-th server. xj represents the amount of resources of a j-th server. yi represents a performance value in the work classification, and a response time in the example of FIG. 1. In addition, aij and bi is a coefficient and an integer specified by a regression analysis. For example, in the example of FIG. 1, in Expression (1), i=1 represents a system performance model of the ordering work and i=2 represents a system performance model of the estimate request work. For example, j=1 is set as a number that identifies a CPU performance value of the Web/AP server 103, and j=2 represents a CPU performance value of the DB server 104.

As a result of processing of (2) of FIG. 1, the apparatus for performance requirement estimation 101 creates system performance model information 150 including the system performance model. The apparatus for performance requirement estimation 101 determines whether or not the new system 102' satisfies requirements of a performance value in relation to a processing pertaining to each of the work classifications based on resource information of the system performance model information 150 and the system performance requirement information 160, as illustrated in (3) of FIG. 1. Here, the system performance requirement information 160 is information disclosing requirements of a performance value in relation to a processing pertaining to each of the work classifications. For example, in the example of FIG. 1, the system performance requirement information 160 discloses that when a response time, as a performance value of a work classification i, is a predetermined value Ci or less, the response time satisfies performance requirements of the work classification i.

The resource information represents the amount of resources of a server included in the new system. Hereinafter, the resource information is set as post-renewal infra information 170. In the example of FIG. 1, the post-renewal infra information 170 discloses that a CPU performance value of the Web/AP server 103' is 25, and a CPU performance value of the DB server 104' is 50.

In FIG. 1, regarding the ordering work, regarding i=1 in Expression (1), the apparatus for performance requirement estimation 101 substitutes x1 with 25 and substitutes x2 with 50, and thereby obtains a response time of the ordering work in the new system 102'. The apparatus for performance requirement estimation 101 determines that, when the obtained response time is C1 or less, the new system 102' satisfies performance requirements of the ordering work. Similarly, regarding the estimate request work, regarding i=2 in Expression (1), the apparatus for performance requirement estimation 101 substitutes x1 with 25 and substitutes x2 with 50, and thereby obtains a response time of the ordering work in the new system 102'. Thereafter, in the same procedure as that for the ordering work, the apparatus for performance requirement estimation 101 determines whether or not the new system 102' satisfies performance requirements of the estimate request work.

The apparatus for performance requirement estimation 101 outputs the determined determination result. As a specific output example, the apparatus for performance requirement estimation 101 outputs that the new system 102' satisfies performance requirements of both the ordering work and the estimate request work. In addition, for example, in a case where performance requirements corresponding to any one work are not satisfied, the apparatus for performance requirement estimation 101 may output that the new system 102' does not satisfy performance requirements of any one work, and may output the name of the work of which performance requirements are not satisfied. A user who views the output result that performance requirements of any one work are not satisfied may consider increasing the amount of resources of the new system 102', or may consider speeding up a program in relation to the work of which performance requirements are not satisfied.

As described above, the apparatus for performance requirement estimation 101 appropriately specifies the use amount of resources of each of the work classifications and thus may output a determination result with favorable accuracy. In addition, the apparatus for performance requirement estimation 101 may obtain a determination result as to whether the new system 102' satisfies performance requirements corresponding to each of processing classifications without transferring the renewal target system 102. The server included in the renewal target system 102 may be one. In addition, the renewal target system 102 may be a work system, but is not limited thereto. For example, the renewal target system 102 may be a personal or domestic system. Next, description will be provided on a system including the apparatus for performance requirement estimation 101 with reference to FIG. 2.

Figure 2:
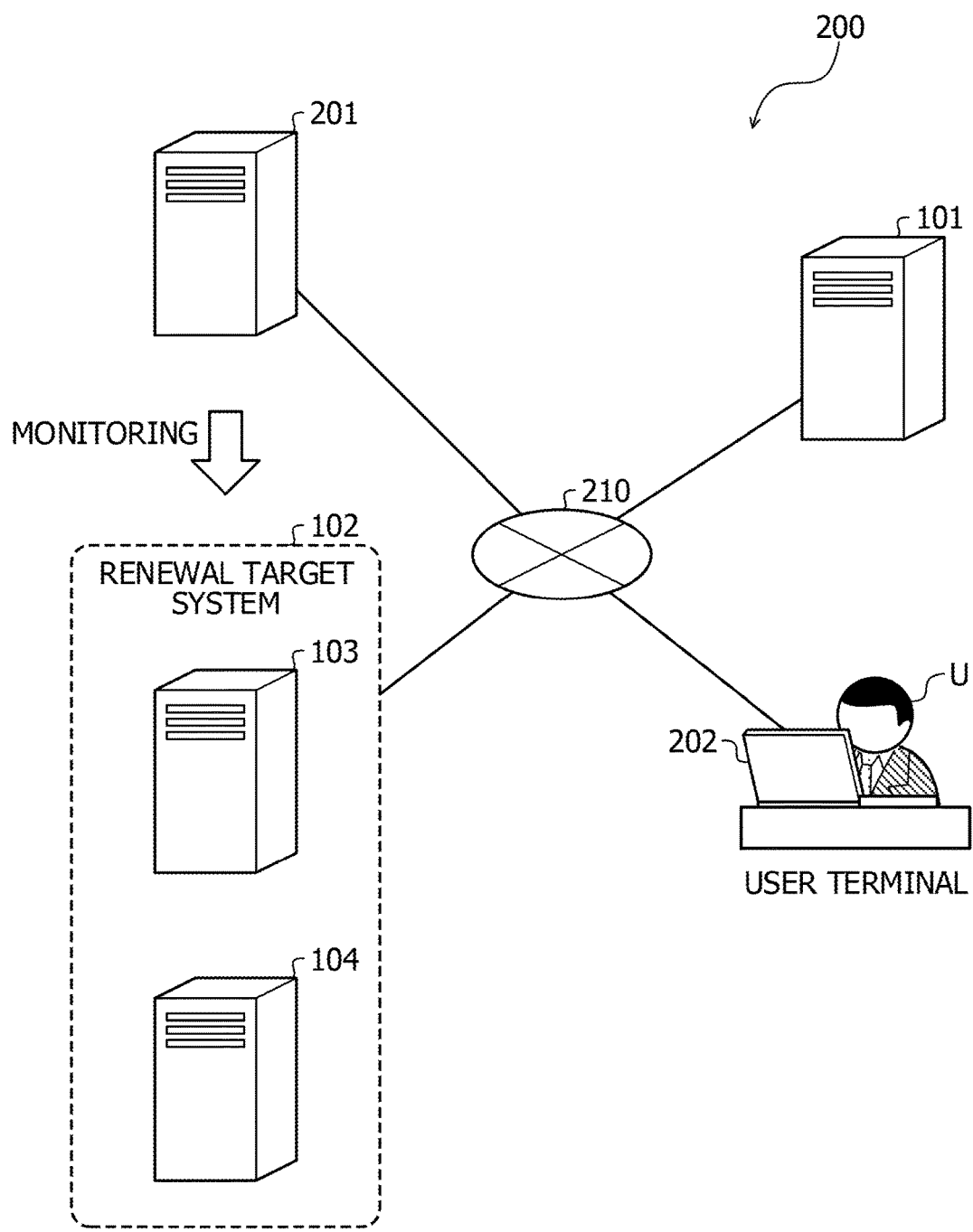
FIG. 2 is an explanatory view illustrating a configuration example of a system for performance requirement estimation.

FIG. 2 is an explanatory view illustrating a configuration example of a system for performance requirement estimation 200. The system for performance requirement estimation 200 includes the apparatus for performance requirement estimation 101, an operation management server 201, a user terminal 202, and the renewal target system 102. The apparatus for performance requirement estimation 101, the operation management server 201, the user terminal 202, and the renewal target system 102 are connected to one another via a network 210 such as the Internet, a local area network (LAN), and a wide area network (WAN).

The operation management server 201 is a computer that monitors the renewal target system 102. The user terminal 202 is a computer manipulated by a user U. The user U is a person in charge who is in charge of transfer of the renewal target system 102, for example. Next, description will be provided on a configuration example of hardware of the apparatus for performance requirement estimation 101 with reference to FIG. 3.

Figure 3:
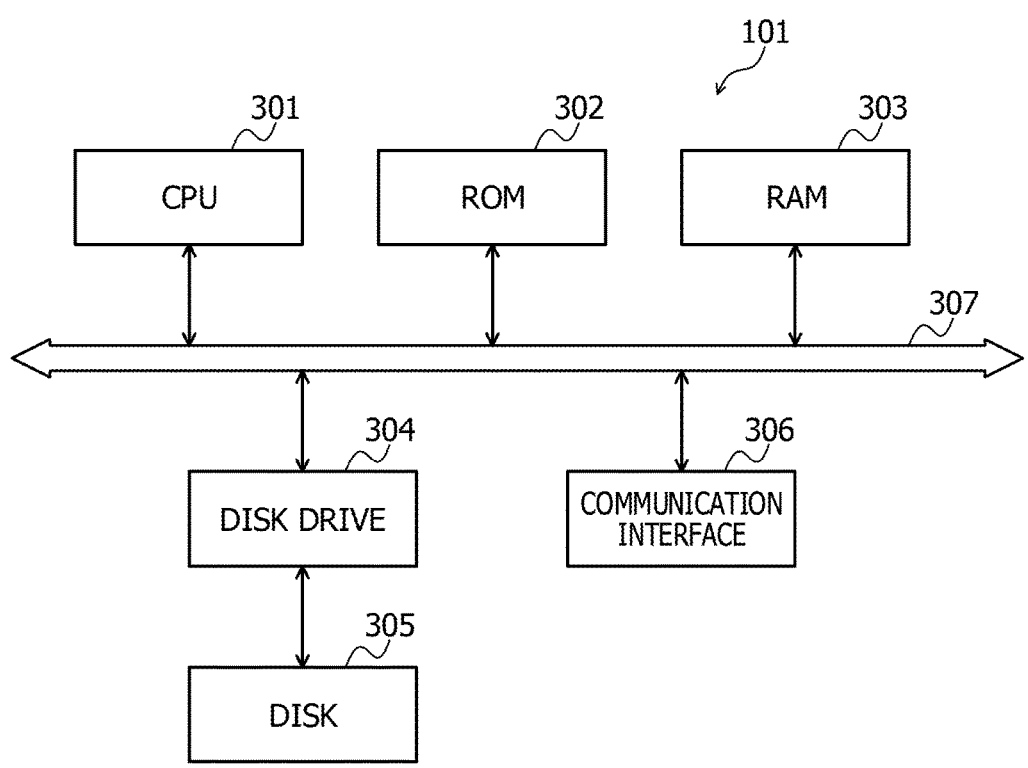
FIG. 3 is an explanatory view illustrating a hardware configuration example of the apparatus for performance requirement estimation.

FIG. 3 is an explanatory view illustrating the configuration example of hardware of the apparatus for performance requirement estimation 101. In FIG. 3, the apparatus for performance requirement estimation 101 includes a CPU 301, a read-only memory (ROM) 302, and a random access memory (RAM) 303. In addition, the apparatus for performance requirement estimation 101 includes a disk drive 304, a disk 305, and a communication interface 306. In addition, the CPU 301 to disk drive 304 and the communication interface 306 are connected to one another via a bus 307.

The CPU 301 is an arithmetic processor that administers overall control of the apparatus for performance requirement estimation 101. The ROM 302 is a non-volatile memory that stores programs such as a boot program. The RAM 303 is a volatile memory that is used as a work area of the CPU 301.

The disk drive 304 is a control unit that controls data read and write with respect to the disk 305 in accordance with control of the CPU 301. As the disk drive 304, a magnetic disk drive, an optical disk drive, a solid-state drive, and the like may be employed, for example. The disk 305 is a non-volatile memory that stores data written by control of the disk drive 304. For example, in a case where the disk drive 304 is a magnetic disk drive, a magnetic disk may be employed as the disk drive 305. In addition, in a case where the disk drive 304 is an optical disk drive, an optical disk may be employed as the disk 305. In addition, in a case where the disk drive 304 is a solid-state drive, a semiconductor memory formed by a semiconductor memory, a so-called semiconductor disk may be employed as the disk 305.

The communication interface 306 is a control unit that administers a network 210 and an internal interface, and controls input and output of data from other units. Specifically, the communication interface 306 is connected to other units via the network 210 through a communication line. As the communication interface 306, a modem or a LAN adaptor may be employed, for example.

In addition, in a case where a manager of the apparatus for performance requirement estimation 101 directly manipulates the apparatus for performance requirement estimation 101, the apparatus for performance requirement estimation 101 may include hardware such as a display, a keyboard, and a mouse.

In addition, the operation management server 201 includes the same hardware as that of the apparatus for performance requirement estimation 101. In addition, the user terminal 202 includes a display, a keyboard, and a mouse, in addition to the same hardware as that of the apparatus for performance requirement estimation 101.

Functional Configuration Example of Apparatus for Performance Requirement Estimation 101

Figure 4:
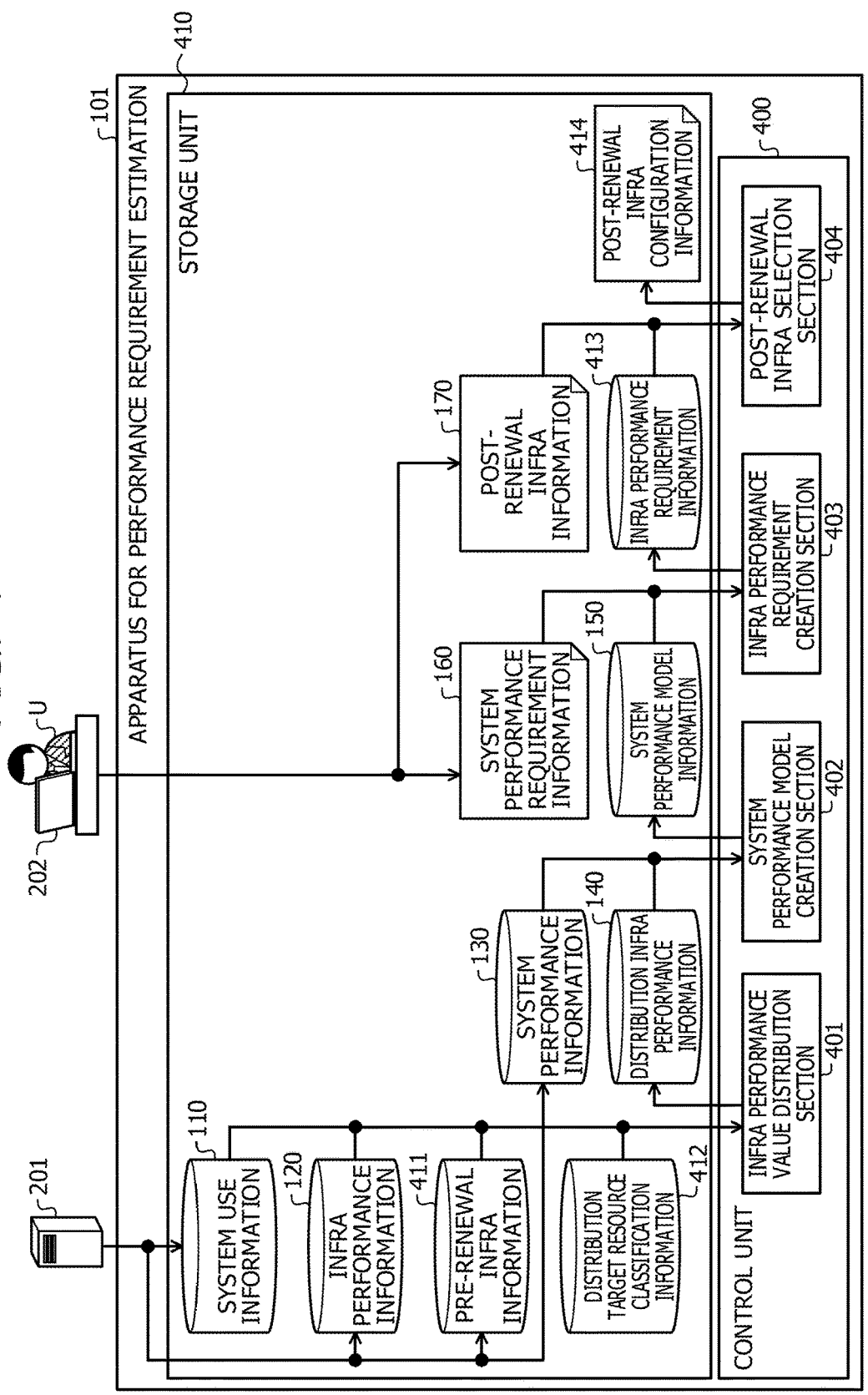
FIG. 4 is an explanatory view illustrating a functional configuration example of the apparatus for performance requirement estimation.

FIG. 4 is an explanatory view illustrating a functional configuration example of the apparatus for performance requirement estimation 101. The apparatus for performance requirement estimation 101 includes a control unit 400. The control unit 400 includes an infra performance value distribution section 401, a system performance model creation section 402, an infra performance requirement creation section 403, and a post-renewal infra selection section 404. The control unit 400 realizes functions of each section by the CPU 301 executing programs stored in a memory. The memory is, specifically, the ROM 302, the RAM 303, and the disk 305 illustrated in FIG. 3, for example. In addition, the processing result of each section is stored in a register of the RAM 303 or the CPU 301, a cache memory of the CPU 301, and the like.

In addition, the apparatus for performance requirement estimation 101 is accessible to a storage unit 410. The storage unit 410 is a memory such as the RAM 303 and the disk 305. The storage unit 410 includes system use information 110, infra performance information 120, system performance information 130, distribution infra performance information 140, system performance model information 150, system performance requirement information 160, and post-renewal infra information 170. Furthermore, the storage unit 410 includes pre-renewal infra information 411, distribution target resource classification information 412, infra performance requirement information 413, and post-renewal infra configuration information 414.

Here, the system use information 110, the infra performance information 120, the pre-renewal infra information 411, and the system performance information 130 is information created by the operation management server 201. Examples of the stored content of the system use information 110, the infra performance information 120, the pre-renewal infra information 411, and the system performance information 130 are illustrated in FIGS. 5 to 7 and FIG. 9, respectively.

Figure 8:
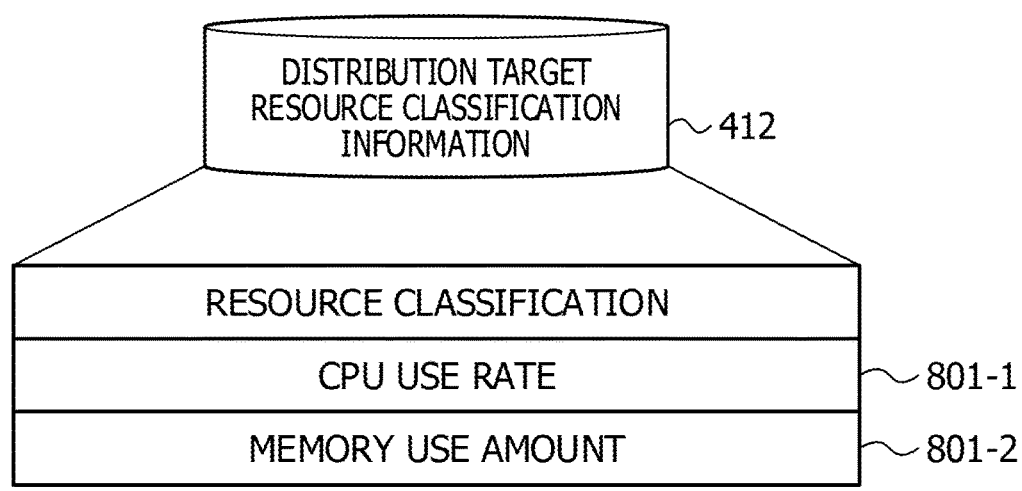
FIG. 8 is an explanatory view illustrating an example of the stored content of distribution target resource classification information.
Figure 12:
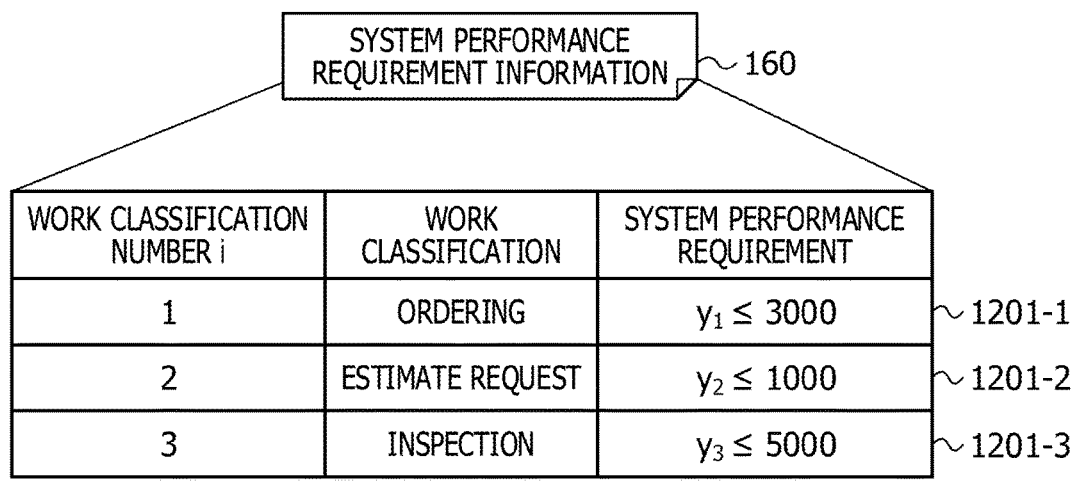
FIG. 12 is an explanatory view illustrating an example of the stored content of system performance requirement information.

The system performance requirement information 160 and the post-renewal infra information 170 are information created by input of the user U from the user terminal 202. Examples of the stored content of the system performance requirement information 160 and the post-renewal infra information 170 are illustrated in FIGS. 12 and 13, respectively. The distribution target resource classification information 412 is information created by input of the user U or input of the manager of the system for performance requirement estimation 200. The distribution target resource classification information 412 is information that specifies processing classifications for which each server included in the renewal target system 102 is used. An example of the stored content of the distribution target resource classification information 412 is illustrated in FIG. 8.

In addition, the distribution infra performance information 140 is information created as a result of executing the infra performance value distribution section 401. Similarly, the system performance model information 150 is information created as a result of executing the system performance model creation section 402. Similarly, the infra performance requirement information 413 is information created as a result of executing the infra performance requirement creation section 403. Similarly, the post-renewal infra configuration information 414 is information created as a result of executing the post-renewal infra selection section 404. Examples of the stored content of the distribution infra performance information 140, the system performance model information 150, the infra performance requirement information 413, and the post-renewal infra configuration information 414 are illustrated in FIGS. 10, 11, 13, and 15, respectively.

The infra performance value distribution section 401 distributes a use amount per unit time of resources of a server included in the renewal target system 102 to each of the work classifications based on the infra performance information 120 and the system use information 110. The infra performance value distribution section 401 creates distributed information as the distribution infra performance information 140. In addition, the infra performance value distribution section 401 may further distribute the use amount per unit time of the resources of the server included in the renewal target system 102 to each of the work classifications using the pre-renewal infra information 411.

In addition, the infra performance value distribution section 401 may distribute a use amount per unit time of resources to each of the work classifications based on the infra performance information 120, the system use information 110, and processing time information disclosing a time taken for a processing pertaining to each of the work classifications corresponding to each of the work classifications to each of the work classifications. The time taken for a processing pertaining to each of the work classifications may be preferably a time taken for one processing. A specific distribution method is explained in FIG. 18.

In addition, all servers of the renewal target system 102 may not be necessarily used in all work classifications. In this case, the infra performance value distribution section 401 distributes a use amount per unit time of resources to each of the work classifications based on the infra performance information 120, the system use information 110, and the distribution target resource classification information 412.

The system performance model creation section 402 creates a system performance model based on the distribution infra performance information 140 and the system performance information 130. A specific creation example of the system performance model is explained in FIG. 19. The system performance model creation section 402 creates system performance model information 150 including the created system performance model.

The infra performance requirement creation section 403 creates information disclosing requirements of a performance value in relation to a processing pertaining to each of the work classifications based on the system performance model information 150 and the system performance requirement information 160. Specifically, the infra performance requirement creation section 403 substitutes an inequation of the system performance requirement information 160 with a system performance model and thereby creates an inequation which is information disclosing requirements of a performance value in relation to a processing pertaining to each of the work classifications. The infra performance requirement creation section 403 creates the infra performance requirement information 413 including the created inequation.

The post-renewal infra selection section 404 determines whether or not the new system 102' satisfies requirements of a performance value in relation to a processing pertaining to each of the work classifications based on the infra performance requirement information 413 and the post-renewal infra information 170. The post-renewal infra selection section 404 outputs the determined determination result.

In addition, the post-renewal infra information 170 may be classification information disclosing classifications of the servers having different amounts of resources which are candidates included in the new system 102'. For example, the post-renewal infra information 170 may include information on a certain server classification and another server classification having different CPU performance values. The post-renewal infra information 170 is considered as classification information. In this case, the post-renewal infra selection section 404 may determine the number of servers for each of the server classifications that satisfies requirements of a performance value in relation to a processing pertaining to each of the work classifications, based on the post-renewal infra information 170 and the infra performance requirement information 413. For example, using the above-described example, the post-renewal infra selection section 404 determines the number of servers of a certain server classification and the number of servers of another server classification. The post-renewal infra selection section 404 outputs the determined number of servers for each of the server classifications in association with the server classification.

For example, in a case where the system performance model is Expression (1), the inequation included in the infra performance requirement information 413 is a −1 squared polynomial expression, and thus the post-renewal infra selection section 404 can determine the number of a certain server and the number of another server by a non-linear programming method. In addition, in a case where the system performance model is a one-dimensional polynomial expression, the inequation included in the infra performance requirement information 413 is a one-dimensional polynomial expression, and thus the post-renewal infra selection section 404 can determine the number of a certain server and the number of another server by a linear programming method.

In addition, the classification information may store an evaluation value of a server classification in association with the server classification. Here, the evaluation value of a server classification may be, for example, an amount of money for one server of the classification, or may be consumed power. In addition, when the server of the classification is a physical machine, the evaluation value may be an average failure period. A plurality of combinations of the number of servers for each of the server classifications that satisfies requirements of a performance value in relation to a processing pertaining to each of the work classifications is obtained by the linear programming method or the non-linear programming method. In this case, the post-renewal infra information 170 may determine the number of servers for each of the server classifications included in each combination of the plurality of combinations and the number of servers for each of the server classifications included in the new system 102' based on an evaluation value of the servers included in each combination.

For example, as the plurality of combinations, a first combination that the number of servers of a certain server classification is 2 and the number of servers of another server classification is 1 and a second combination that the number of a certain server classification is 1 and the number of servers of another classification is 2 are obtained. In addition, the amount of money of the server of a certain server classification is 10 yen per 1 hour and the amount of money of the server of another server classification is 19 yen. In this case, the amount of money taken for the first combination is 10*2+19=39 yen, and the amount of money taken for the second combination is 10+19*2=48 yen. Therefore, the post-renewal infra selection section 404 determines a server specified in the first combination which is cheaper as the server included in the new system 102'.

In addition, in a case where the evaluation value of a server is the consumed power, the post-renewal infra selection section 404 may perform the same processing as in the case where the evaluation value of a server is an amount of money. In addition, in a case where the evaluation value of a server is an average failure period, it is preferable that the average failure period be long, and thus the post-renewal infra selection section 404 may determine a server specified in a combination in which the sum of the average failure periods is the longest as the server included in the new system 102'.

Next, description will be provided on an example of the stored content of information stored in the storage unit 410 using FIGS. 5 to 15.

Figure 5:
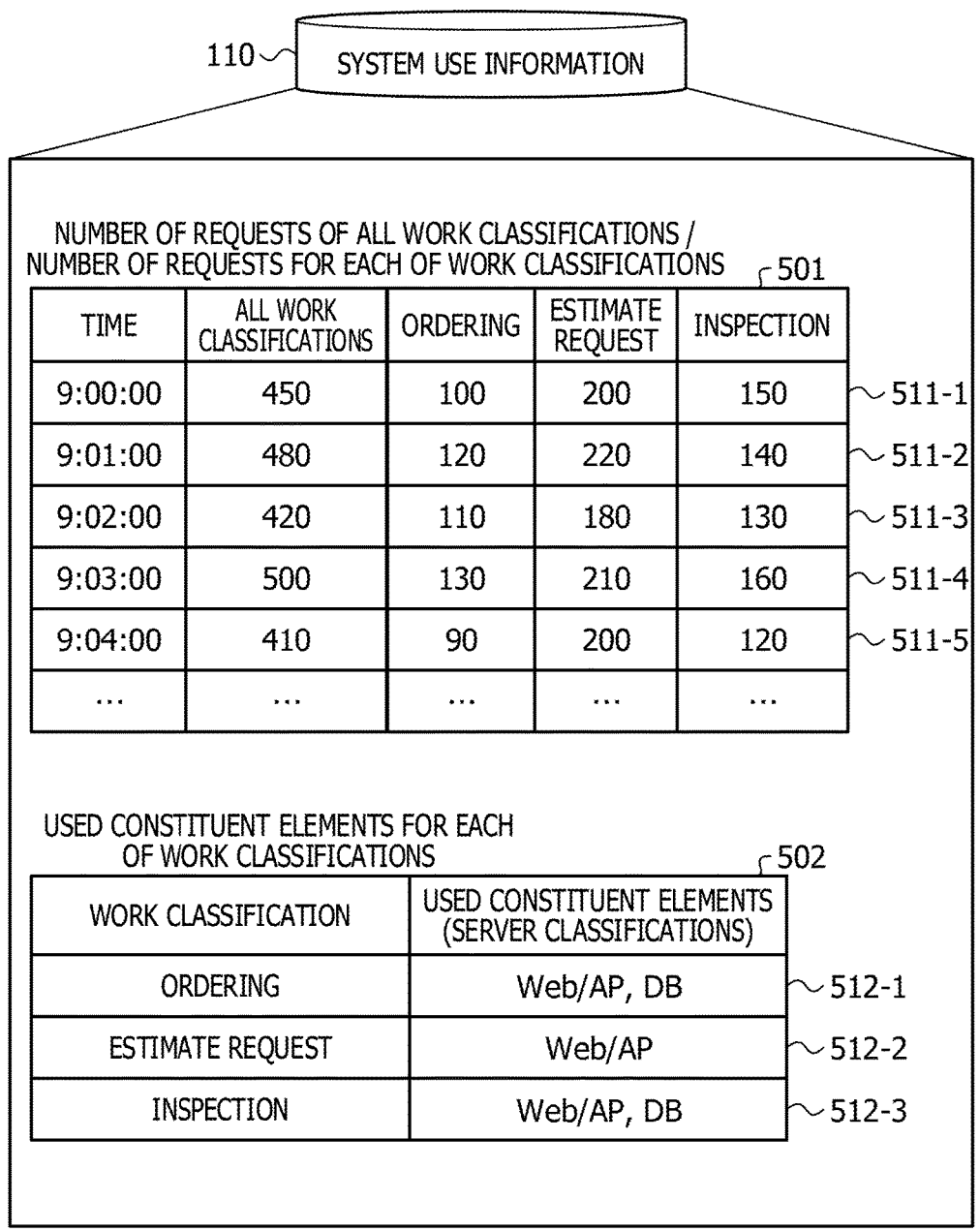
FIG. 5 is an explanatory view illustrating an example of the stored content of system use information.

FIG. 5 is an explanatory view illustrating an example of the stored content of the system use information 110. The system use information 110 illustrated in FIG. 5 includes Table 501 including the number of requests of all the work classifications and the number of requests for each of the work classifications and Table 502 including used constituent elements for each of the work classifications. The Table 501 illustrated in FIG. 5 includes records 511-1 to 511-5. In addition, Table 502 illustrated in FIG. 5 includes records 512-1 to 512-3.

Table 501 includes fields such as time, all work classifications, ordering, estimate request, and inspection. The field of time stores a character string representing time. The field of all work classification stores the number of the requests of all the work classifications. The field of ordering stores the number of requests of the ordering work. The field of estimate request stores the number of requests of the estimate request work. The field of inspection stores the number of requests of the inspection work.

Table 502 includes fields such as work classification and used constituent element (server classification). The field of work classification stores a character string representing a work classification. The field of used constituent element (server classification) stores a server classification used in the work classification.

For example, Table 502 illustrated in FIG. 5 illustrates that, regarding the ordering work and the inspection work, the Web/AP server and the DB server are used, and regarding the estimate request work, the Web/AP server is used and the DB server is not used.

Figure 6:
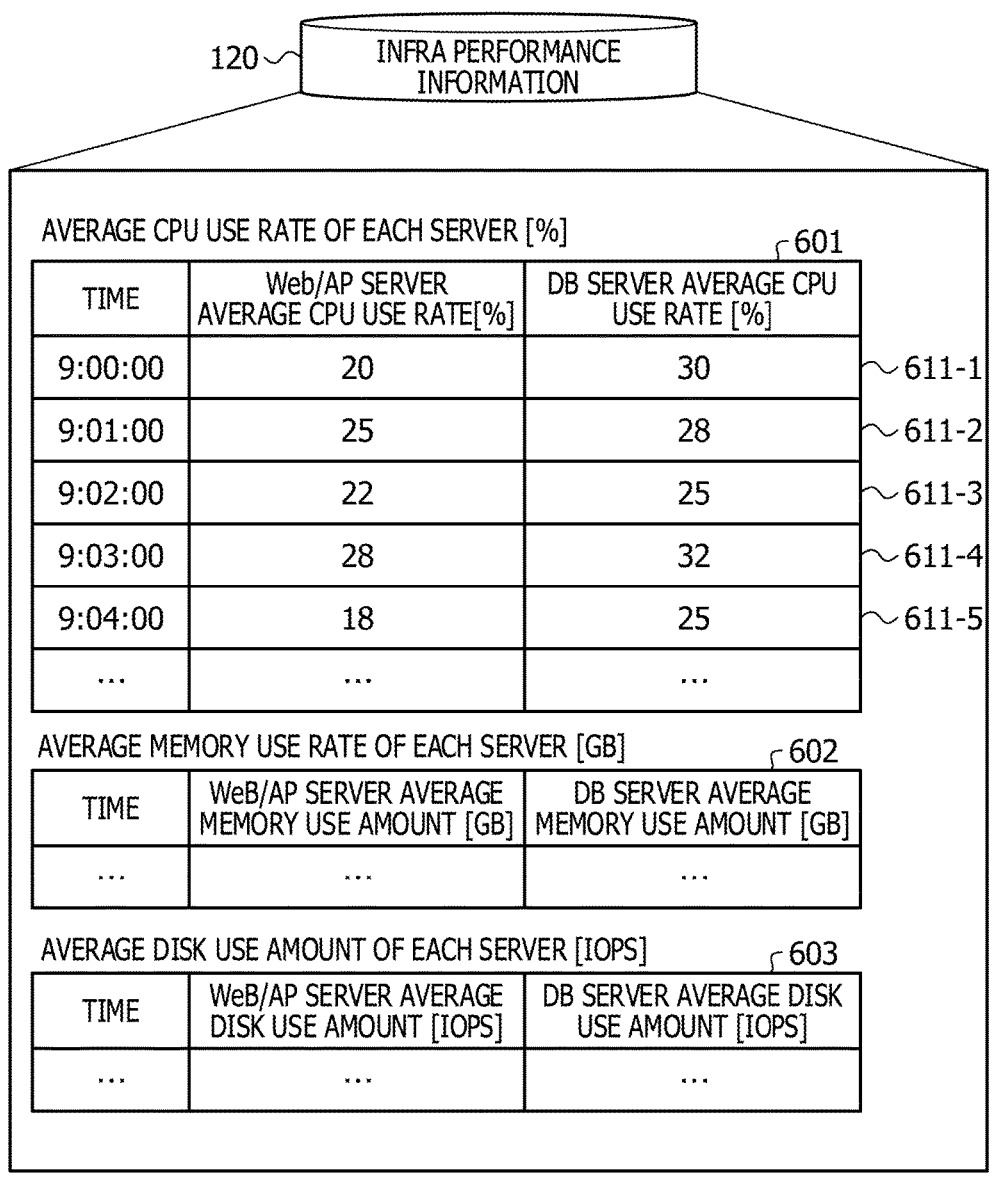
FIG. 6 is an explanatory view illustrating an example of the stored content of infra performance information.

FIG. 6 is an explanatory view illustrating an example of the stored content of the infra performance information 120. The infra performance information 120 illustrated in FIG. 6 includes tables for each of the resource classifications, specifically, Table 601 including an average CPU use rate of each server, Table 602 including an average memory use amount of each server, and Table 603 including an average disk use amount of each server. Table 601 illustrated in FIG. 6 includes records 611-1 to 611-5.

Table 601 includes fields such as time and average CPU use rate of each server. In addition, Table 602 includes fields such as time and average memory use amount of each server. In addition, Table 603 includes fields such as time and average disk use amount of each server. Each server illustrated in FIG. 6 is the Web/AP server or the DB server.

For example, the record 611-1 discloses that, at the time of 9:00:00, the average CPU use amount of the Web/AP server is 20%, and the average CPU use rate of the DB server is 30%.

Figure 7:
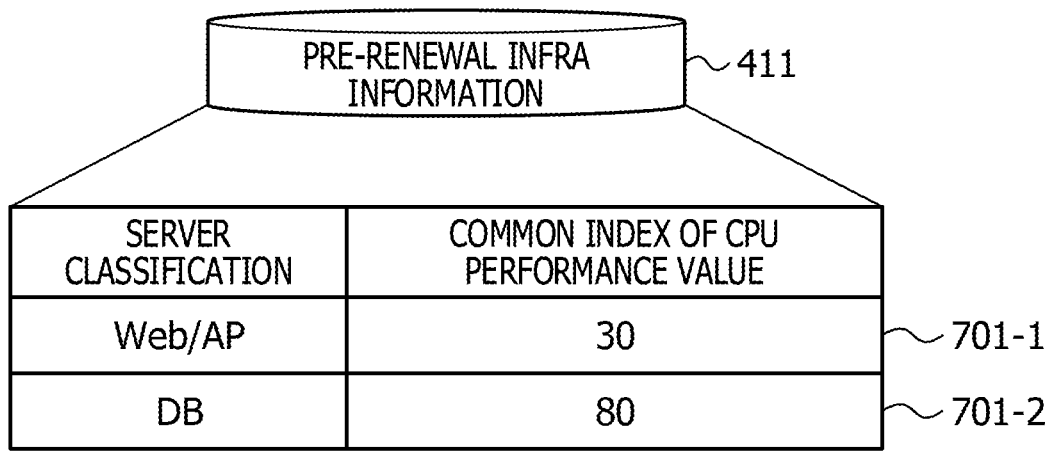
FIG. 7 is an explanatory view illustrating an example of the stored content of pre-renewal infra information.

FIG. 7 is an explanatory view illustrating an example of the stored content of the pre-renewal infra information 411. The pre-renewal infra information 411 illustrated in FIG. 7 includes records 701-1 and 701-2.

The pre-renewal infra information 411 includes fields such as server classification and common index of CPU performance value. The field of server classification stores a character string representing a server classification. The field of common index of CPU performance value stores a value representing a common index of a CPU performance value of the server. Here, an example of the common index of a CPU performance value is standard performance evaluation corporation (SPEC) CPU, and the like.

FIG. 8 is an explanatory view illustrating an example of the stored content of the distribution target resource classification information 412. The distribution target resource classification information 412 illustrated in FIG. 8 includes records 801-1 and 801-2.

The distribution target resource classification information 412 includes a field such as resource classification. The field of resource classification stores a resource classification which is a distribution target.

Figure 9:
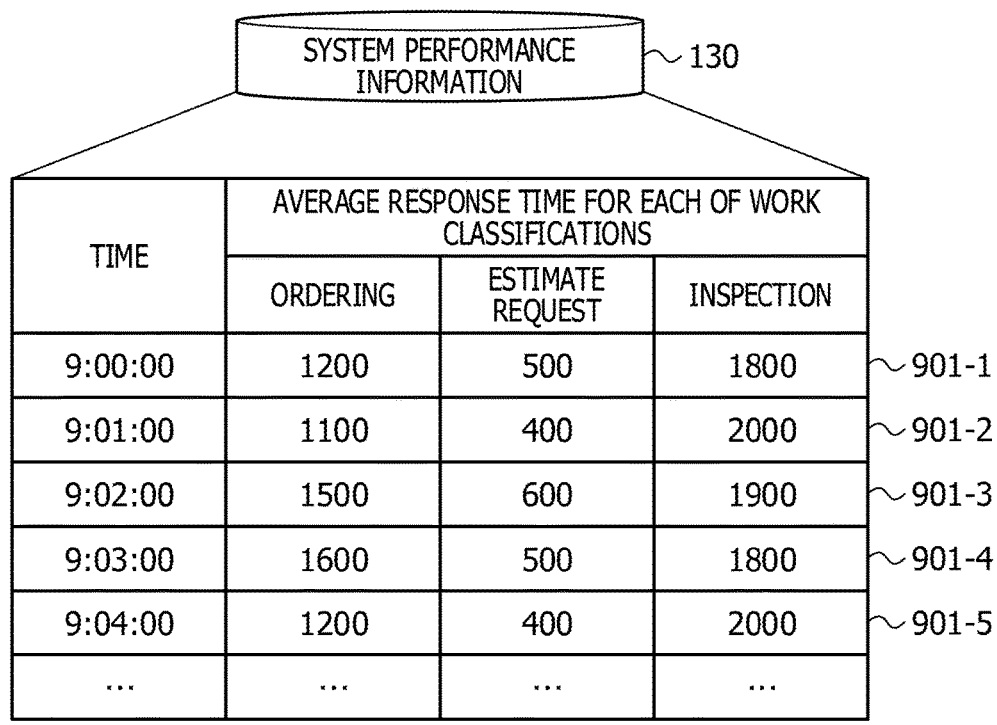
FIG. 9 is an explanatory view illustrating an example of the stored content of system performance information.

FIG. 9 is an explanatory view illustrating an example of the stored content of the system performance information 130. The system performance information 130 illustrated in FIG. 9 includes records 901-1 to 901-5.

The system performance information 130 includes fields such as time and average response time for each of the work classifications. The system performance information 130 illustrated in FIG. 9 illustrates average response times of the ordering work, the estimate request work, and the inspection work, as the work classifications.

Figure 10:
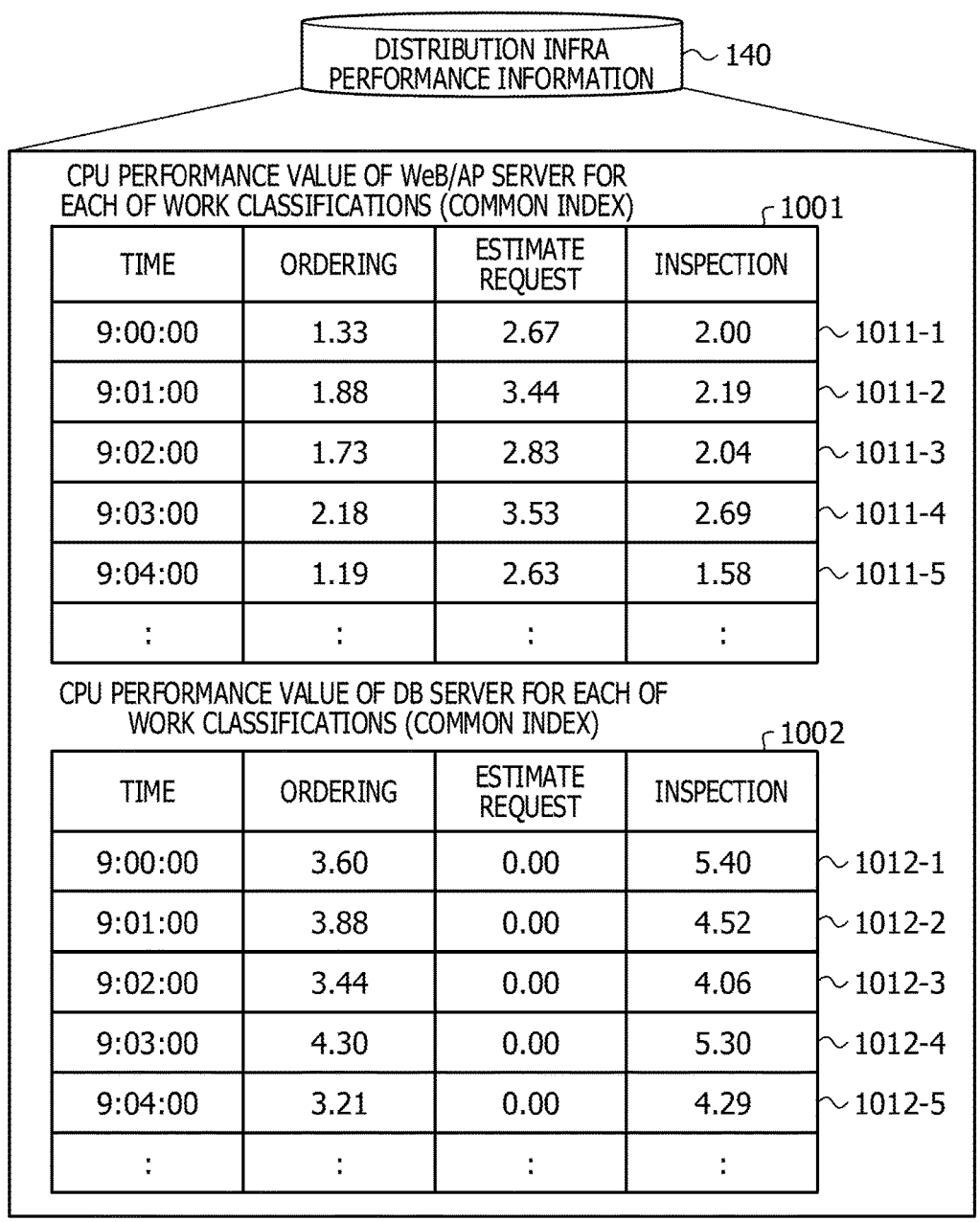
FIG. 10 is an explanatory view illustrating an example of the stored content of distribution infra performance information.
Figure 17A:
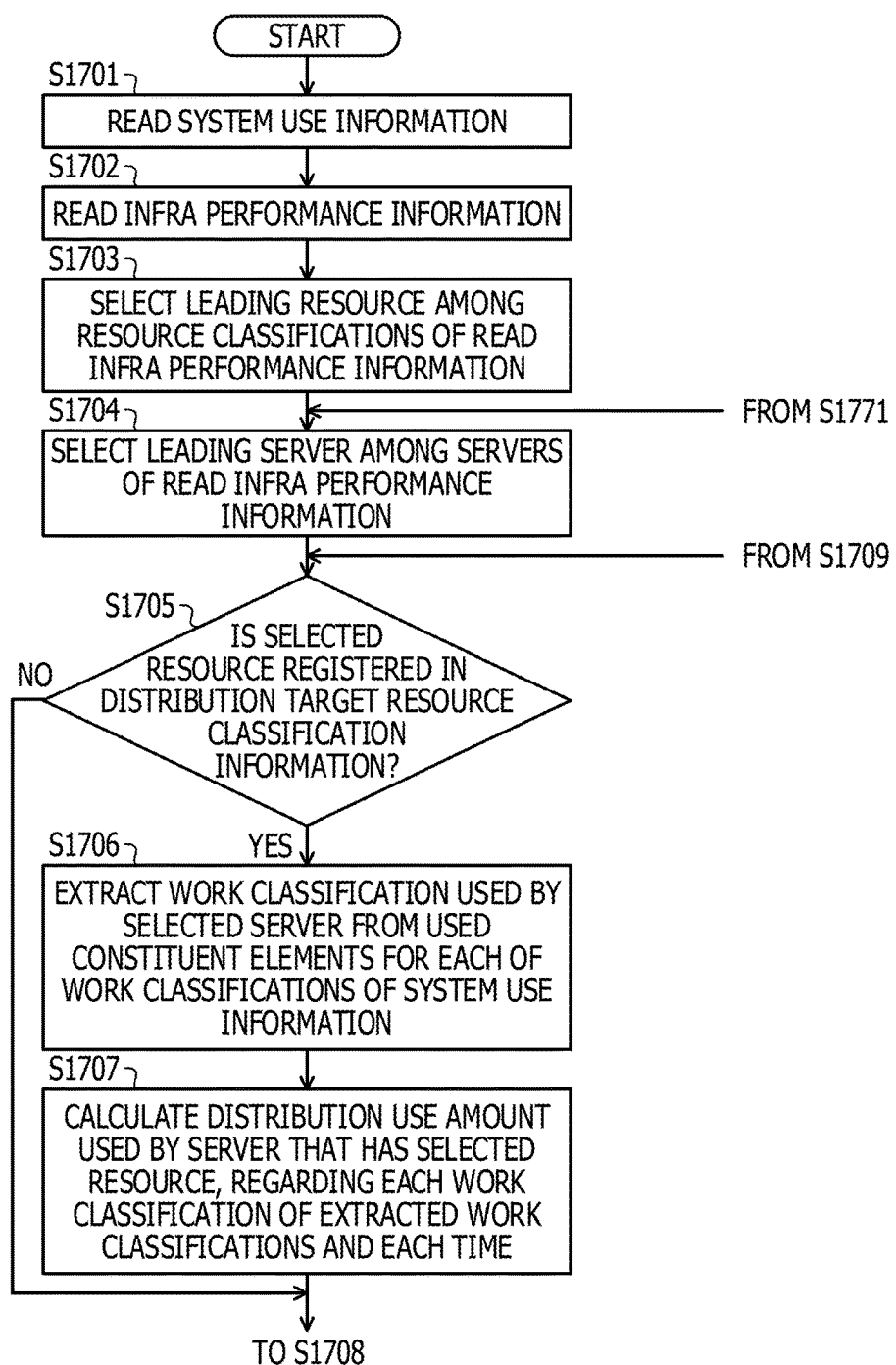
FIGS. 17A and 17B are flowcharts illustrating an example of an infra performance value distribution processing procedure.
Figure 17B:
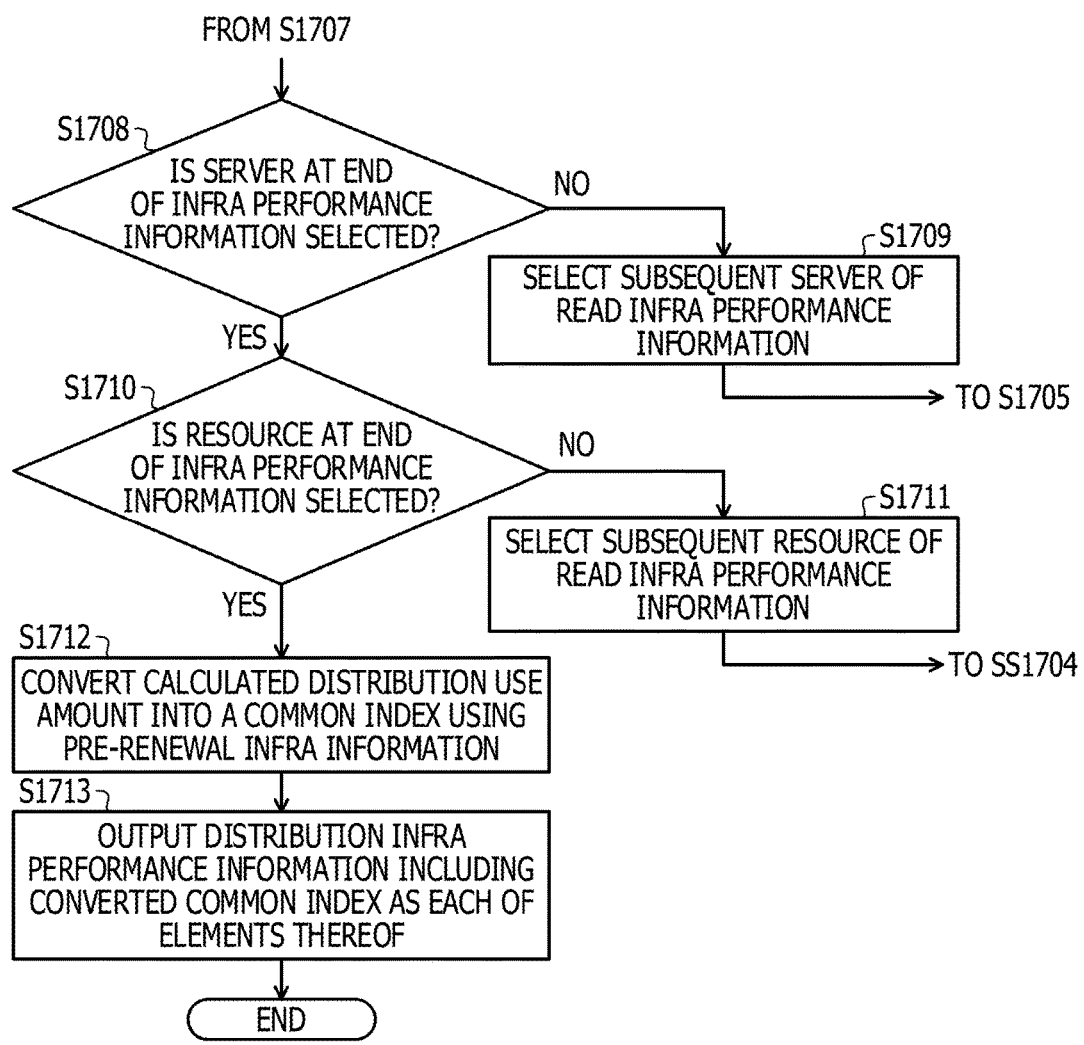

FIG. 10 is an explanatory view illustrating an example of the stored content of the distribution infra performance information 140. The distribution infra performance information 140 illustrated in FIG. 10 includes a CPU performance value for each server and for each work classification. Specifically, the distribution infra performance information 140 illustrated in FIG. 10 includes Table 1001 including a CPU performance value (common index) of the Web/AP server for each of the work classifications, and Table 1002 including a CPU performance value (common index) of the DB server for each of the work classifications Table 1001 illustrated in FIG. 10 includes records 1011-1 to 1011-5. In addition, Table 1002 includes records 1012-1 to 1012-5. FIG. 17 (i.e. FIGS. 17A and 17B) illustrates a creation example of the distribution infra information 140.

For example, the record 1011-1 discloses an example that, at the time of 9:00:00, the CPU performance value of the Web/AP server is distributed to the ordering work by 1.33, to the estimate request work by 2.67, and to the inspection work by 2.00.

Figure 11:
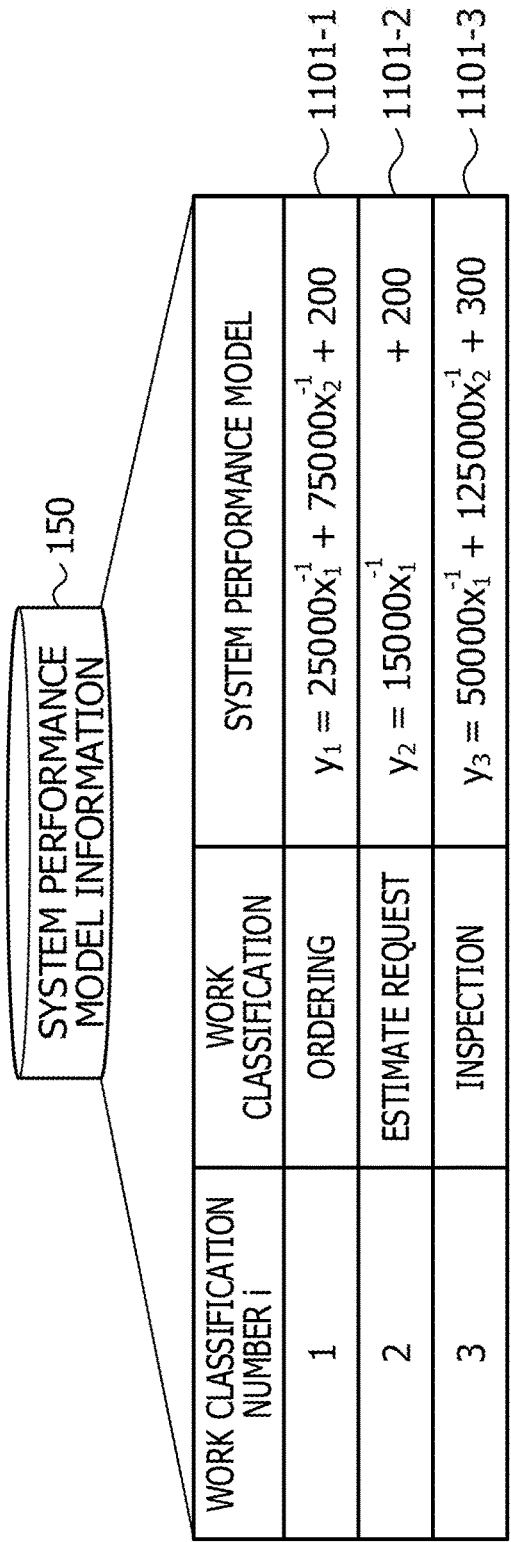
FIG. 11 is an explanatory view illustrating an example of the stored content of system performance model information.
Figure 19:
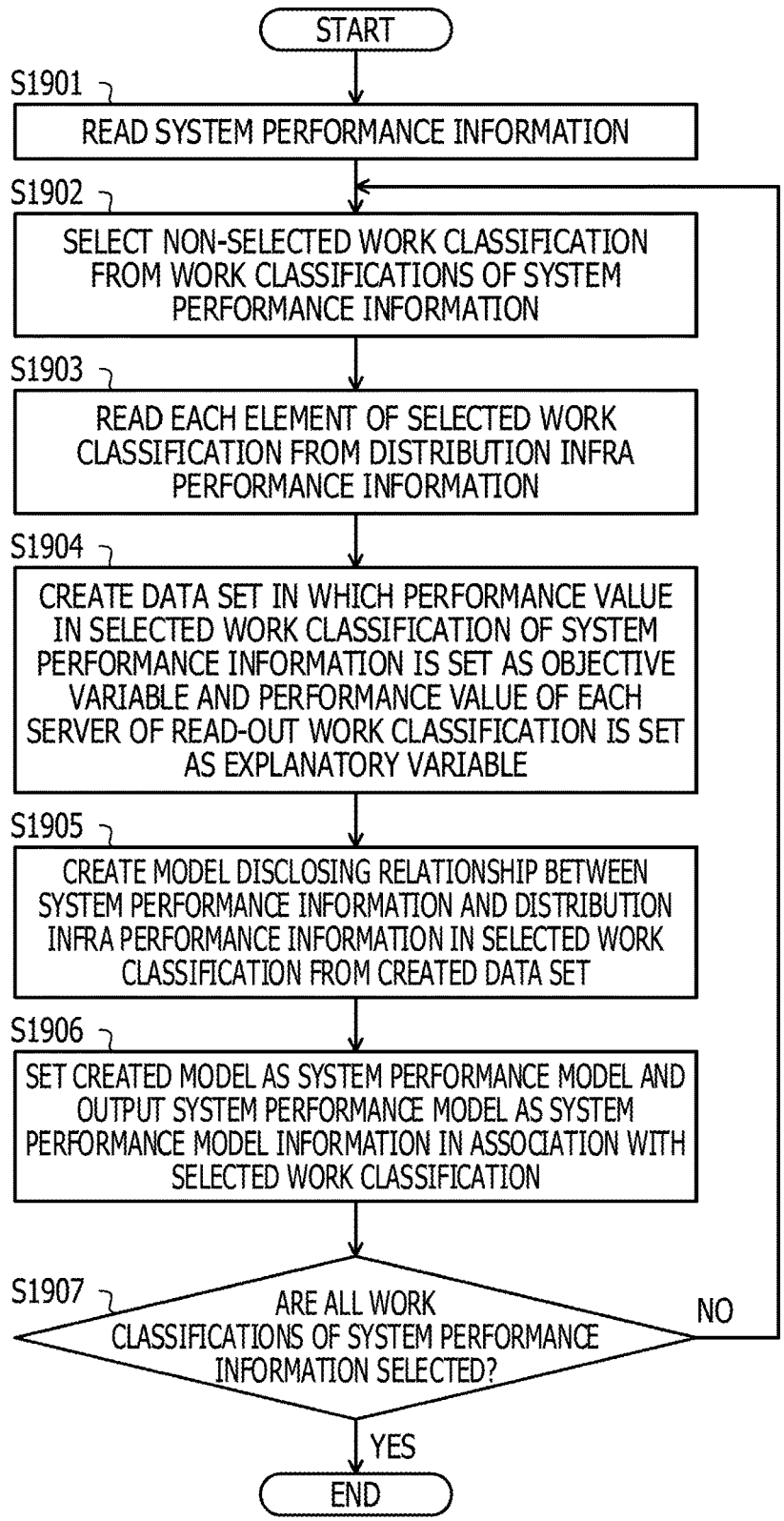
FIG. 19 is a flowchart illustrating an example of a system performance model information creation processing procedure.

FIG. 11 is an explanatory view illustrating an example of the stored content of the system performance model information 150. The system performance model information 150 illustrated in FIG. 11 includes records 1101-1 to 1101-3. FIG. 19 illustrates a creation example of the system performance model information 150.

The system performance model information 150 includes fields such as work classification number i, work classification, and system performance model. The work classification number i includes a number identifying a work classification. The field of work classification stores a character string representing a work classification. The field of system performance model stores a model representing relationship between the system performance information and the distribution infra performance information in the work classification.

For example, y of the system performance model disclosed in the records 1101-1 to 1101-3 represents online response time (msec) of the work classification. In addition, x1 represents a CPU performance value (common index) of the Web/AP server. In addition, x2 represents a CPU performance value (common index) of the DB server. Moreover, in a case where there is a plurality of server classifications, xi represents a sum value of the total number of the server classifications.

FIG. 12 is an explanatory view illustrating an example of the store content of the system performance requirement information 160. The system performance requirement information 160 illustrated in FIG. 12 includes records 1201-1 to 1201-3.

The system performance requirement information 160 includes fields such as work classification number i, work classification, and system performance requirement. The field of work classification number i stores a number identifying a work classification. The field of work classification stores a character string representing a work classification. The field of system performance requirement stores an inequation representing requirements that the online response time yi (msec) has to satisfy.

FIG. 13 is an explanatory view illustrating an example of the stored content of the infra performance requirement information 413. The infra performance requirement information 413 illustrated in FIG. 13 includes records 1301-1 to 1301-3.

The infra performance requirement information 413 includes fields such as work classification number i, work classification, and infra performance requirement. The field of work classification number i stores a number identifying a work classification. The field of work classification stores a character string representing a work classification. The field of infra performance requirement stores an inequation representing infra performance requirements.

FIG. 14 is an explanatory view illustrating an example of the stored content of the post-renewal infra information 170. The post-renewal infra information 170 illustrated in FIG. 14 includes records 1401-1 to 1401-3.

The post-renewal infra information 170 includes fields such as server type, memory, CPU performance value (common index), and price. The field of server type stores a character string representing a server type. The field of memory stores a memory amount that the server has. The field of CPU performance value (common index) stores a CPU performance value (common index) of the server. The field of price stores a price per unit time in the server.

Figure 15:
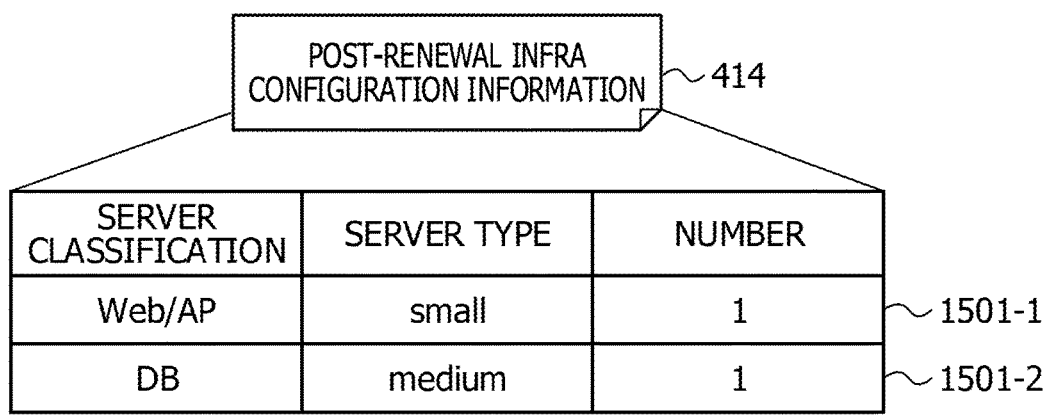
FIG. 15 is an explanatory view illustrating an example of the stored content of post-renewal infra configuration information.
Figure 21:
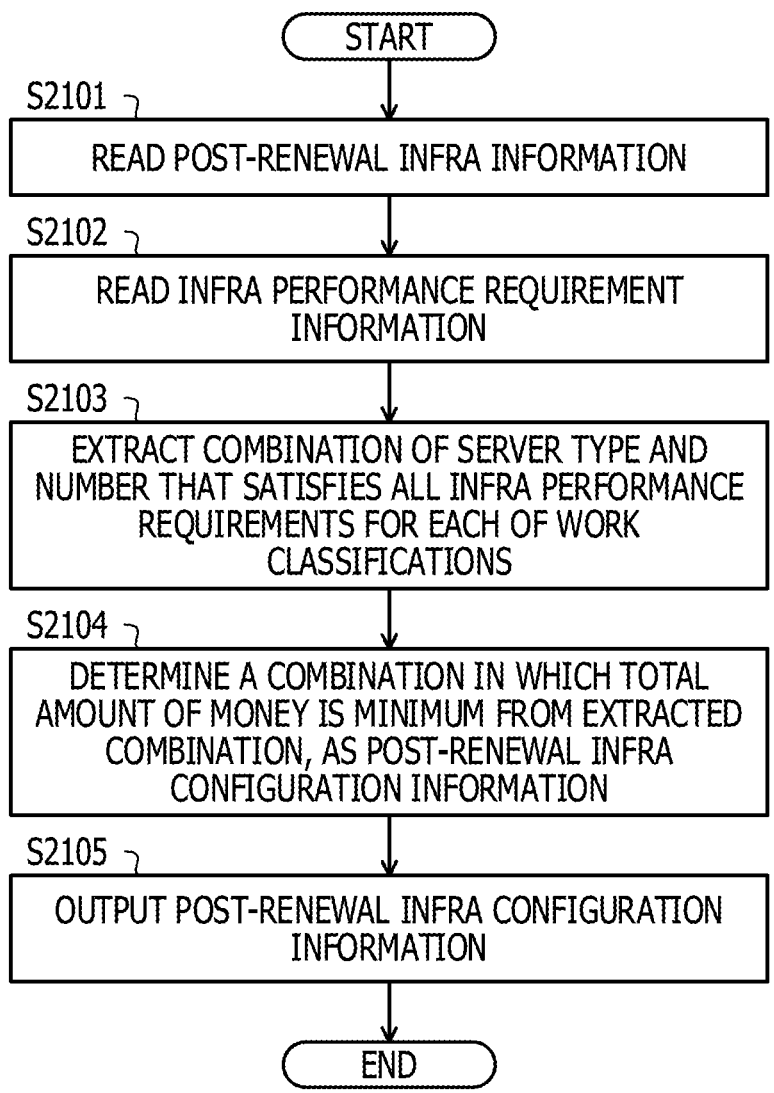
FIG. 21 is a flowchart illustrating an example of a post-renewal infra selection processing procedure.

FIG. 15 is an explanatory view illustrating an example of the stored content of the post-renewal infra configuration information 414. The post-renewal infra configuration information 414 illustrated in FIG. 15 includes records 1501-1 and 1501-2. FIG. 21 illustrates a creation example of the post-renewal infra configuration information 414.

The post-renewal infra configuration information 414 includes fields such as server classification, server type, and number. The field of server classification stores a character string representing a server classification. The field of server type stores a server type of the server classification in the post-renewal infra configuration. The field of number stores the number of server types of the server classification in the post-renewal infra configuration.

Specifically, in the example of FIG. 15, the post-renewal infra configuration discloses that, regarding the Web/AP server, the number of the server of which server type is small may be one, and regarding the DB server, the number of the server of which the server type is medium may be one.

Next, FIGS. 16, 17, and 19 to 21 illustrate a flowchart of a performance requirement estimation processing executed by the apparatus for performance requirement estimation 101.

Figure 16:
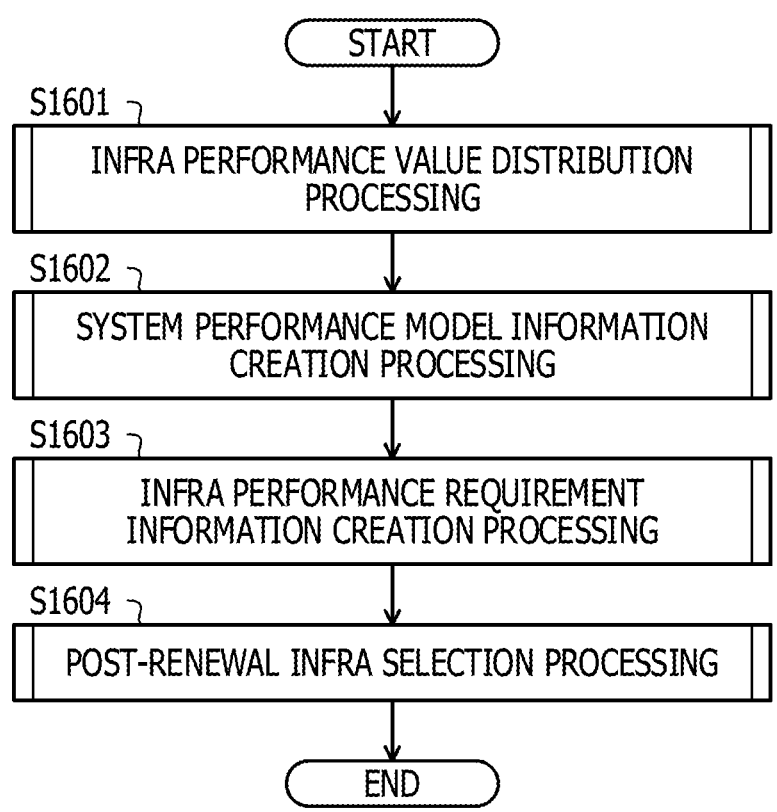
FIG. 16 is a flowchart illustrating an example of a performance requirement estimation processing procedure.
Figure 20:
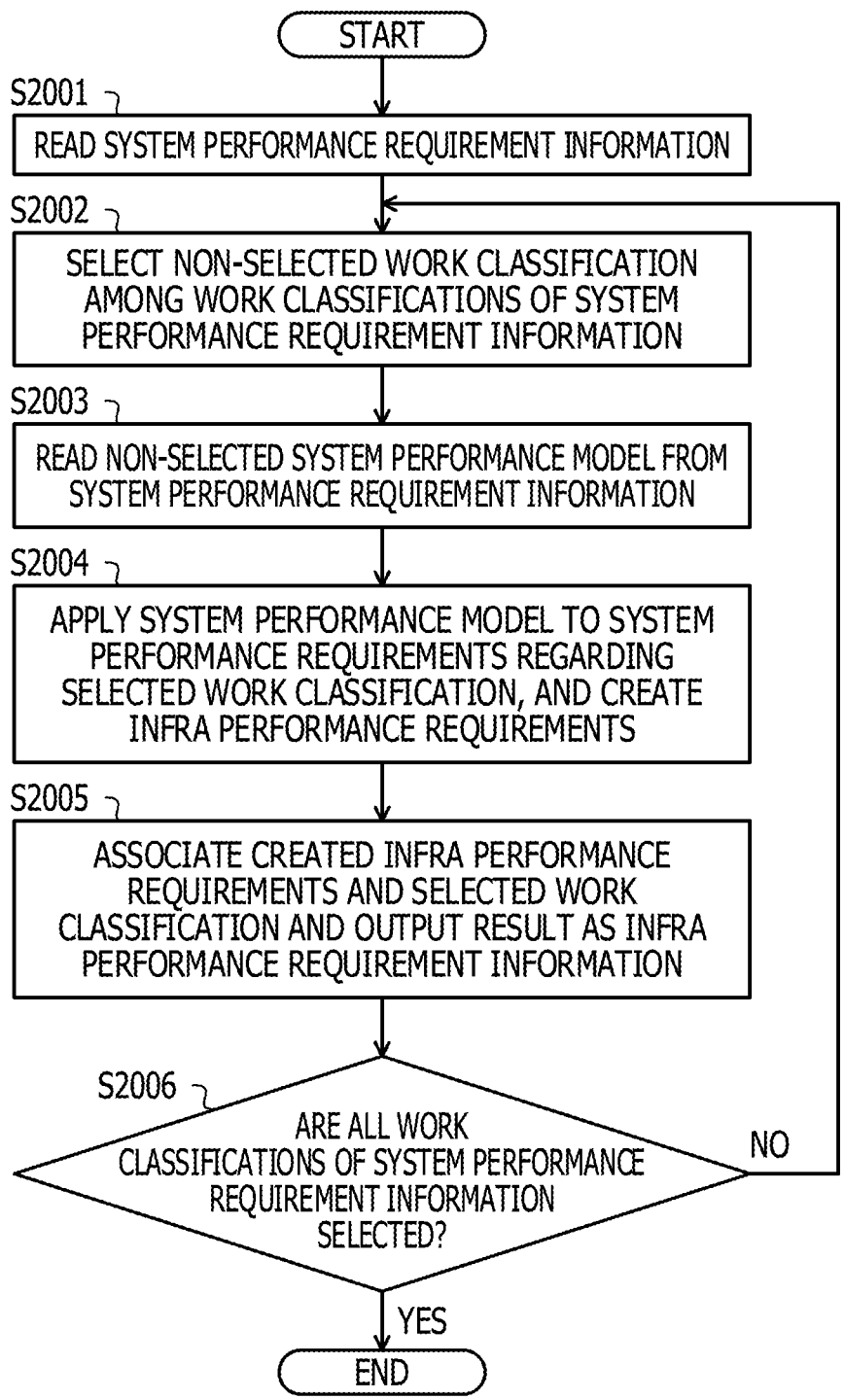
FIG. 20 is a flowchart illustrating an example of an infra performance requirement information creation processing procedure.

FIG. 16 is a flowchart illustrating an example of a performance requirement estimation processing procedure. The apparatus for performance requirement estimation 101 executes an infra performance value distribution processing (step S1601). The infra performance value distribution processing is illustrated in FIG. 17. Next, the apparatus for performance requirement estimation 101 executes a system performance model information creation processing (step S1602). The system performance model information creation processing is illustrated in FIG. 19. The apparatus for performance requirement estimation 101 executes an infra performance requirement information creation processing (step S1603). The infra performance requirement information creation processing is illustrated in FIG. 20. Next, the apparatus for performance requirement estimation 101 executes a post-renewal infra selection processing (step S1604). The post-renewal infra selection processing is illustrated in FIG. 21. After finishing the processing in step S1604, the apparatus for performance requirement estimation 101 finishes a performance requirement estimation processing.

FIG. 17 is a flowchart illustrating an example of an infra performance value distribution processing procedure. The apparatus for performance requirement estimation 101 reads the system use information 110 (step S1701). In addition, the apparatus for performance requirement estimation 101 reads the infra performance information 120 (step S1702). Next, the apparatus for performance requirement estimation 101 selects a leading resource among the resource classifications of the read infra performance information 120 (step S1703). For example, using the infra performance information 120 illustrated in FIG. 6, the apparatus for performance requirement estimation 101 selects a CPU use rate as the leading resource. In addition, the apparatus for performance requirement estimation 101 selects a leading server among the servers of the read infra performance information 120 (step S1704). For example, using the infra performance information 120 illustrated in FIG. 6, the apparatus for performance requirement estimation 101 selects the Web/AP server as the leading server.

Next, the apparatus for performance requirement estimation 101 determines whether or not the selected resource is registered in the distribution target resource classification information 412 (step S1705). For example, using the distribution target resource classification information 412 illustrated in FIG. 8, the apparatus for performance requirement estimation 101 determines Yes in step S1705 when the selected resource is a CPU use rate or a memory use amount. In addition, when the selected resource is a disk use amount, the apparatus for performance requirement estimation 101 determines No in step S1705.

In a case where the selected resource is registered in the distribution target resource classification information 412 (Yes in step S1705), the apparatus for performance requirement estimation 101 extracts a work classification used by the selected server, from used constituent elements for each of the work classifications of the system use information 110 (step S1706). For example, using the system use information 110 illustrated in FIG. 5, when the selected server is the Web/AP server, the apparatus for performance requirement estimation 101 extracts the ordering work, the estimate request work, and the inspection work, as work classifications. In addition, when the selected server is the DB server, the apparatus for performance requirement estimation 101 extracts the ordering work and the inspection work as work classifications.

The apparatus for performance requirement estimation 101 calculates a distribution use amount used by the server that has selected the selected resource, regarding each work classification of the extracted work classifications and each time (step S1707). Specifically, the apparatus for performance requirement estimation 101 calculates a distribution use amount of the extracted ordering work at a certain time using Expression (2).

> Distribution use amount=(the number of requests of the ordering work at a certain time/the number of requests of all the work classifications at a certain time)×a use amount of a selected resource in a server selected at a certain time (2)

Here, a specific example of the processing in step S1707 is explained using the system use information 110 illustrated in FIG. 5 and the infra performance information 120 illustrated in FIG. 6. For example, the selected resource is a CPU use rate, and the selected server is the Web/AP server. In this case, the apparatus for performance requirement estimation 101 calculates a distribution use amount of the extracted ordering work at the time of 9:00:00 as follows by applying Expression (2).

> Distribution use amount=(100/450)×20≈4.44

Here, the method of calculating the distribution use amount is not limited to the above-described method. For example, the apparatus for performance requirement estimation 101 may calculate the distribution use amount obtained by considering the average processing time of the requests of each of the work classifications, using other calculation methods of the distribution use amount. FIG. 18 illustrates an example of other calculation methods of the distribution use amount.

In a case where the selected resource is not registered in the distribution target resource classification information 412 (No in step S1705), or after finishing the processing in step S1707, the apparatus for performance requirement estimation 101 determines whether or not a server at the end of the infra performance information 120 is selected (step S1708). In a case where the server at the end of the infra performance information 120 is not selected (No in step S1708), the apparatus for performance requirement estimation 101 selects a subsequent server of the read infra performance information 120 (step S1709), and proceeds to the processing in step S1705.

On the other hand, in a case where the server at the end of the infra performance information 120 is selected (Yes in step S1708), the apparatus for performance requirement estimation 101 determines whether or not a resource at the end of the infra performance information is selected (step S1710). In a case where the resource at the end of the infra performance information is not selected (No in step S1710), the apparatus for performance requirement estimation 101 selects a subsequent resource of the read infra performance information (step S1711), and proceeds to the processing in step S1704.

On the other hand, in a case where the resource at the end of the infra performance information (Yes in step S1710), the apparatus for performance requirement estimation 101 converts the calculated distribution use amount into a common index using the pre-renewal infra information 411 (step S1712). Specifically, the apparatus for performance requirement estimation 101 converts the distribution use amount into the common index using Expression (3).

> Distribution use amount(common index)=a distribution use amount×a common index of a CPU performance value of the pre-renewal infra information 411/100 (3)

For example, when the distribution use amount 4.44 of the ordering work at the time of 9:00:00, calculated in the explanation of the processing in step S1707, is converted into a common index using Expression (3), the result is as follows.

> Distribution use amount(common index)=4.44×30/100≈1.33 the calculated value of 1.33 is coincident with the value of the field of ordering of the record 1011-1 illustrated in FIG. 10.

The apparatus for performance requirement estimation 101 outputs the distribution infra performance information 140 including the converted common index as each of the elements thereof (step S1713). After finishing the processing in step S1713, the apparatus for performance requirement estimation 101 finishes the infra performance value distribution processing.

FIG. 18 is an explanatory view illustrating an example of other calculation methods of a distribution use amount. Table 1800 illustrated in FIG. 18 illustrates an average processing time corresponding to each of the processing classifications, used in other calculation methods of a distribution use amount. Table 1800 illustrated in FIG. 18 includes records 1801-1 to 1801-3. Table 1800 corresponds to the processing time information illustrated in FIG. 4.

For example, the record 1801-1 discloses that, in the ordering work, an average processing time of the Web/AP server taken for 1 request is 30 msec, and an average processing time of the DB server taken for 1 request is 8 msec. For example, as a creation example of the average processing time taken for 1 request, analysis may be performed on a time when a response to a request is issued from a time when the operation management server 201 receives a request with respect to the Web/AP server 103 or the DB server 104.

The apparatus for performance requirement estimation 101 calculates a distribution use amount obtained by considering an average processing time of requests of each of the work classifications based on Expression (4).

> Distribution use amount=a use amount of a selected resource in a server selected at a certain time×a total request processing time of each of the work classifications/a sum of a total request processing time of all work classifications (4)

Here, the total request processing time of each of the work classifications can be obtained by the number of requests× the average processing time. For example, the selected resource is a CPU use rate, and the selected server is the Web/AP server. In this case, the apparatus for performance requirement estimation 101 calculates a distribution use amount of the extracted ordering work at the time of 9:00:00 as follows by applying Expression (4).

> Distribution use amount=20×(100×30)/(100×30+200×20+150×50)≈4.14%

FIG. 19 is a flowchart illustrating an example of the system performance model information creation processing procedure. The apparatus for performance requirement estimation 101 reads the system performance information 130 (step S1901). Next, the apparatus for performance requirement estimation 101 selects a non-selected work classification from the work classifications of the system performance information 130 (step S1902). The apparatus for performance requirement estimation 101 reads each element of the selected work classification from the distribution infra performance information 140 (step S1903).

Next, the apparatus for performance requirement estimation 101 creates a data set in which a performance value in the selected work classification of the system performance information 130 is set as an objective variable and a performance value of each server of the read-out work classification is set as an explanatory variable (step S1904). For example, using the system performance information 130 illustrated in FIG. 9, the objective variable of the created data set is a value of the field of ordering of the records 901-1 to 901-5. In addition, using the distribution infra performance information 140 illustrated in FIG. 10, the explanatory variable of the created data set is a value of the field of ordering of the records 1011-1 to 1011-5 and a value of the field of ordering of the records 1012-1 to 1012-5.

The apparatus for performance requirement estimation 101 creates a model disclosing a relationship between the system performance information 130 and the distribution infra performance information 140 in the selected work classification from the created data set through a statistical analysis (step S1905). The created model is, for example, the system performance model of the system performance model information 150 illustrated in FIG. 11. Here, when creating a model, an appropriate polynomial expression model is prepared in advance. In the model illustrated in FIG. 11, the polynomial expression model is Expression (5).

$$y = ax_1^{-1} + bx_2^{-1} + c \quad (5)$$

The apparatus for performance requirement estimation 101 determines values of a, b, and c through a statistical analysis. In addition, in the system performance model illustrated in FIG. 11, x1 and x2 are a CPU performance value (common index) of the Web/AP server and a CPU performance value (common index) of the DB server, respectively, as also illustrated in FIG. 11. For example, in terms of including a memory amount in the resource, the polynomial expression model to be prepared in advance is Expression (6).

$$y = ax_1^{-1} + bx_2^{-1} + cx_3^{-1} + dx_4^{-1} + e \quad (6)$$

Here, x3 is a memory amount of the Web/AP server. In addition, x4 is a memory amount of the DB server.

In addition, in the example of FIG. 11, as the CPU performance value becomes larger, the online response time y becomes shorter. Therefore, the multiplier of x is −1 so that monotone decrease is disclosed. As an example of another polynomial expression model, in a case where y is the number of requests that can be processed per unit time, as the CPU performance value becomes larger, the number of requests that can be processed increases. Therefore, the polynomial expression model to be prepared in advance is, for example, Expression (7).

$$y = ax_1 + bx_2 + c \quad (7)$$

The apparatus for performance requirement estimation 101 sets the created model as a system performance model and outputs the system performance model as the system performance model information 150 in association with the selected work classification (step S1906). Next, the apparatus for performance requirement estimation 101 determines whether or not all the work classifications of the system performance information 130 are selected (step S1907). In a case where there is a non-selected work classification among the work classification of the system performance information 130 (No in step S1907), the apparatus for performance requirement estimation 101 proceeds to the processing in step S1902. On the other hand, in a case where all the work classification of the system performance information 130 are selected (Yes in step S1907), the apparatus for performance requirement estimation 101 finishes the system performance model information creation processing.

FIG. 20 is a flowchart illustrating an example of the infra performance requirement information creation processing procedure. The apparatus for performance requirement estimation 101 reads the system performance requirement information 160 (step S2001). Next, the apparatus for performance requirement estimation 101 selects a non-selected work classification among the work classification of the system performance requirement information 160 (step S2002). The apparatus for performance requirement estimation 101 reads a non-selected system performance model from the system performance requirement information 160 (step S2003). Next, the apparatus for performance requirement estimation 101 applies the system performance model to the system performance requirements regarding the selected work classification, and creates infra performance requirements (step S2004). The apparatus for performance requirement estimation 101 associates the created infra performance requirements and the selected work classification and outputs the result as the infra performance requirement information 413 (step S2005). Next, the apparatus for performance requirement estimation 101 determines whether or not all the work classifications of the system performance requirement information 160 are selected (step S2006).

In a case where there is a non-selected work classification among the work classifications of the system performance requirement information 160 (No in step S2006), the apparatus for performance requirement estimation 101 proceeds to the processing in step S2002. On the other hand, in a case where all the work classifications of the system performance requirement information 160 are selected (Yes in step S2006), the apparatus for performance requirement estimation 101 finishes the infra performance requirement information creation processing.

FIG. 21 is a flowchart illustrating an example of the post-renewal infra selection processing procedure. The apparatus for performance requirement estimation 101 reads the post-renewal infra information 170 (step S2101). In addition, the apparatus for performance requirement estimation 101 reads the infra performance requirement information 413 (step S2102). The apparatus for performance requirement estimation 101 extracts a combination of a server type and the number that satisfies all infra performance requirements for each of the work classifications (step S2103).

Description will be provided using the infra performance requirement information 413 illustrated in FIG. 13 and the post-renewal infra information 170 illustrated in FIG. 14. For example, one small server as the Web/AP server and one medium server as the DB server are assumed as server candidates included in the system after renewal. In this case, the apparatus for performance requirement estimation 101 substitutes x1 of the infra performance requirements of the record 1301-1 with 25 which is a CPU performance value (common index) of the record 1401-1. Similarly, the apparatus for performance requirement estimation 101 substitutes x2 of the infra performance requirements of the record 1301-1 with 50 which is a CPU performance value (common index) of the record 1401-2. The apparatus for performance requirement estimation 101 determines whether or not the assumed systems after renewal satisfy the infra performance requirements of the ordering work by determining if the inequation of the infra performance requirements of the record 1301-1 is true or false.

Next, the apparatus for performance requirement estimation 101 determines a combination in which the total amount of money is the minimum from the extracted combination, as the post-renewal infra configuration information 414 (step S2104). The apparatus for performance requirement estimation 101 outputs the post-renewal infra configuration information 414 (step S2105). After finishing the processing in step S2105, the apparatus for performance requirement estimation 101 finishes the post-renewal infra selection processing.

As described above, the apparatus for performance requirement estimation 101 substitutes the system performance model created from the distribution infra performance information 140 and the performance value of each of the work classifications with the amount of resources of the new system 102' and determines whether or not the performance requirements of each of the work classifications are satisfied. In this manner, the apparatus for performance requirement estimation 101 appropriately specifies the use amount of resources of each of the work classifications, and thus can output a determination result with favorable accuracy. Therefore, the user U can obtain a verification result as to whether it is possible to perform transfer or not before performing transfer of the renewal target system 102.

In addition, the apparatus for performance requirement estimation 101 may determine the number of servers for each of the server classifications that satisfy performance requirements disclosed in the infra performance requirement information 413. In this manner, the user U can recognize the number of servers for each of the server classifications that satisfy the performance requirements corresponding to each of the work classifications. In this manner, the user U can operate the renewal target system 102 more stably.

In addition, when there is a plurality of combinations of the number of server classifications that satisfy the performance requirements disclosed in the infra performance requirement information 413, the apparatus for performance requirement estimation 101 may determine the number of server classifications based on evaluation values of the server classifications. In this manner, the user U can recognize the combination with the best evaluation value, that is, the smallest amount of money and the small consumed power, for example.

In addition, the apparatus for performance requirement estimation 101 may distribute a use amount per unit time of a resource included in the renewal target system 102 considering the average processing time for each of the work classifications. Here, depending on the work classification, there are cases where it takes time for one processing and it takes almost no time for one processing. Therefore, the apparatus for performance requirement estimation 101 can distribute the use amount of a resource more accurately by considering the average processing time of each of the work classifications. In addition, by more accurately distributing the use amount of a resource, the apparatus for performance requirement estimation 101 can further improve the accuracy of determination as to whether or not the new system 102' satisfies performance requirements corresponding to each of the work classifications.

In addition, the apparatus for performance requirement estimation 101 distributes a use amount per unit time of a resource to each of the work classifications by considering the distribution target resource classification information 412. In this manner, in a case where all the servers of the renewal target system 102 are not necessarily used for all the work classifications, that is, even in a case where some servers are used only for certain work classifications, it is possible to apply the embodiment.

The method for performance requirement estimation described in the embodiment can be realized by running a program that is prepared in advance on a computer such as a personal computer and a workstation. The program for performance requirement estimation is recorded in a computer-readable recording medium such as a hard disk, a flexible disk, a compact disc-read only memory (CD-ROM), and a digital versatile disk (DVD), and is run by being read out from a recording medium by a computer. In addition, the program for performance requirement estimation may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for performance requirement estimation, the apparatus comprising:
   a memory; and
   a processor coupled to the memory and configured to
   execute a distribution processing that includes distributing a use amount per unit time with respect to resources in each of a plurality of first machines included in a system to each of processing classifications in accordance with use information and demand information, in which the system is configured to execute processes pertaining to each of the processing classifications, in which the use information indicates the use amount with respect to the resources in each of the plurality of first machines when each of the plurality of first machines is used in executing the processes pertaining to each of the processing classifications, and in which the demand information indicates the number of demands per unit time with respect to the processes pertaining to each of the processing classifications,
   execute a creation processing that includes creating a model corresponding to each of the processing classifications in accordance with both of system performance information and the use amount distributed to each of the processing classifications, in which the model is configured to output a performance value with respect to the processes pertaining to each of the processing classifications in accordance with an input indicating the amount of resources to be distributed for performing the processes, and in which the system performance information indicates a performance value per unit time with respect to the processes pertaining to each of the processing classifications in the system,
   execute a determination processing that includes
      acquiring system performance requirement information indicating requirements of a performance value with respect to the processes pertaining to each of the processing classifications,
      acquiring resource information indicating the amount of resources with respect to a plurality of second machines included in a new system to be configured to perform the processes pertaining to each of the processing classifications, and determining whether or not the new system satisfies the requirements of the performance value with respect to the processes pertaining to each of the processing classifications in accordance with the model, the system performance requirement information, and the resource information, and execute an output processing that includes outputting a determination result obtained by the determination processing.

2. The apparatus according to claim 1, wherein the processor is configured to execute a second determination processing that includes acquiring classification information indicating a machine classification with respect to each of a plurality of third machines that is allocatable to the new system as the plurality of second machines, and determining, among the third machines, one or more of eligible machines that satisfy requirements of a performance value with respect to the processes pertaining to each of the processing classifications, for each of the machine classifications indicated in the classification information, in accordance with the model, the system performance requirement information, and the classification information, and wherein the output processing further includes outputting the number of the one or more of eligible machines for each of the machine classifications indicated in the classification information, in association with the machine classifications.

3. The apparatus according to claim 2, wherein the classification information further includes an evaluation value for each of the machine classifications, and wherein the second determination processing includes, in a case where the machine classification corresponding to each of the one or more of eligible machines is not identically present, determining the number of the third machines actually allocated to the new system as the plurality of the second machines for each of the machine classifications, in accordance with the number of the one or more of eligible machines for each of the machine classifications and the evaluation value for each of the machine classifications.

4. The apparatus according to claim 1, wherein the distribution processing acquires processing time information indicating a time taken for the processes pertaining to each of the processing classifications, regarding each of the processing classifications, and distributes the use amount with respect to resources in each of the plurality of first machines to the each of the processing classifications, in accordance with the use information, the demand information, and the processing time information.

5. A method, performed by a computer for performance requirement estimation, the method comprising:

executing, by a processor of the computer, a distribution processing that includes distributing a use amount per unit time with respect to resources in each of a plurality of first machines included in a system to each of processing classifications in accordance with use information and demand information, in which the system is configured to execute processes pertaining to each of the processing classifications, in which the use information indicates the use amount with respect to the resources in each of the plurality of first machines when each of the plurality of first machines is used in executing the processes pertaining to each of the processing classifications, and in which the demand information indicates the number of demands per unit time with respect to the processes pertaining to each of the processing classifications, executing, by the processor of the computer, a creation processing that includes creating a model corresponding to each of the processing classifications in accordance with both of system performance information and the use amount distributed to each of the processing classifications, in which the model is configured to output a performance value with respect to the processes pertaining to each of the processing classifications in accordance with an input indicating the amount of resources to be distributed for performing the processes, and in which the system performance information indicates a performance value per unit time with respect to a processes pertaining to each of the processing classifications in the system, executing, by the processor of the computer, a determination processing that includes acquiring system performance requirement information indicating requirements of a performance value with respect to the processes pertaining to each of the processing classifications, acquiring resource information indicating the amount of resources with respect to a plurality of second machines included in a new system to be configured to perform the processes pertaining to each of the processing classifications, and determining whether or not the new system satisfies the requirements of the performance value with respect to the processes pertaining to each of the processing classifications in accordance with the model, the system performance requirement information, and the resource information, and executing, by the processor of the computer, an output processing that includes outputting a determination result obtained by the determination processing.

6. A non-transitory computer-readable storage medium for storing a program that causes a processor to perform a process for performance requirement estimation, the process comprising:

executing a distribution processing that includes distributing a use amount per unit time with respect to resources in each of a plurality of first machines included in a system to each of processing classifications in accordance with use information and demand information, in which the system is configured to execute processes pertaining to each of the processing classifications, in which the use information indicates the use amount with respect to the resources in each of the plurality of first machines when each of the plurality of first machines is used in executing the processes pertaining to each of the processing classifications, and in which the demand information indicates the number of demands per unit time with respect to the processes pertaining to each of the processing classifications, executing a creation processing that includes creating a model corresponding to each of the processing classifications in accordance with both of system performance information and the use amount distributed to each of the processing classifications, in which the model is configured to output a performance value with respect to the processes pertaining to each of the processing classifications in accordance with an input indicating the amount of resources to be distributed for performing the processes, and in which the system performance information indicates a performance value per unit time with respect to a processes pertaining to each of the processing classifications in the system, executing a determination processing that includes acquiring system performance requirement information indicating requirements of a performance value with respect to the processes pertaining to each of the processing classifications, acquiring resource information indicating the amount of resources with respect to a plurality of second machines included in a new system to be configured to perform the processes pertaining to each of the processing classifications, and determining whether or not the new system satisfies the requirements of the performance value with respect to the processes pertaining to each of the processing classifications in accordance with the model, the system performance requirement information, and the resource information, and executing an output processing that includes outputting a determination result obtained by the determination processing.

* * * * *